United States Patent
Nakase et al.

(10) Patent No.: US 10,098,368 B2
(45) Date of Patent: Oct. 16, 2018

(54) PET FOOD AND METHOD OF MANUFACTURING PET FOOD

(71) Applicant: Unicharm Corporation, Ehime (JP)

(72) Inventors: Koichi Nakase, Itami (JP); Fumisato Yoshiga, Itami (JP)

(73) Assignee: UNICHARM CORPORATION, Ehime (JP)

( * ) Notice: Subject to any disclaimer, the term of this patent is extended or adjusted under 35 U.S.C. 154(b) by 204 days.

(21) Appl. No.: 14/428,633

(22) PCT Filed: Sep. 18, 2013

(86) PCT No.: PCT/JP2013/075961
§ 371 (c)(1),
(2) Date: Mar. 16, 2015

(87) PCT Pub. No.: WO2014/046293
PCT Pub. Date: Mar. 27, 2014

(65) Prior Publication Data
US 2015/0245639 A1    Sep. 3, 2015

(30) Foreign Application Priority Data
Sep. 20, 2012 (JP) ................. 2012-206863

(51) Int. Cl.
*A23K 20/158* (2016.01)
*A23K 1/16* (2006.01)
(Continued)

(52) U.S. Cl.
CPC ............ *A23K 1/164* (2013.01); *A23K 20/111* (2016.05); *A23K 20/137* (2016.05);
(Continued)

(58) Field of Classification Search
CPC ........ A23K 40/10; A23K 40/25; A23K 50/42; A23K 20/111; A23K 20/137;
(Continued)

(56) References Cited

U.S. PATENT DOCUMENTS 4,006,266 A * 2/1977 Bone ................. A23K 40/20
426/623
4,229,485 A * 10/1980 Brown ................. A23K 40/30
426/302
(Continued)

FOREIGN PATENT DOCUMENTS

| CN | 102076223 A | 5/2011 |
|---|---|---|
| JP | 64-39953 A | 2/1989 |

(Continued)

OTHER PUBLICATIONS

JP2009189244A translation, pub Aug. 27, 2009.*
(Continued)

*Primary Examiner* — Drew E Becker
*Assistant Examiner* — Bryan Kim
(74) *Attorney, Agent, or Firm* — Hauptman Ham, LLP

(57) ABSTRACT

The present description relates to a method of manufacturing a pet food including adding a first oil or fat to food granules prepared by granulating a mixture of ingredients, subsequently baking the food granules, and then adding a second oil or fat. The food granules contain a reducing sugar prior to baking. The amount added of the first oil or fat represents 0.5 to 8.0% by weight of the total weight of a combination of the mixture, the first oil or fat and the second oil or fat. The combined amount added of the first oil or fat and the second oil or fat represents 5.0 to 13.0% by weight of the total weight.

16 Claims, 3 Drawing Sheets

(51) Int. Cl.
   *A23L 5/10*      (2016.01)
   *A23P 20/10*     (2016.01)
   *A23P 10/25*     (2016.01)
   *A23K 40/00*     (2016.01)
   *A23K 40/10*     (2016.01)
   *A23K 20/111*    (2016.01)
   *A23K 20/137*    (2016.01)
   *A23K 20/163*    (2016.01)
   *A23K 50/42*     (2016.01)
   *A23P 10/20*     (2016.01)
   *A23P 30/20*     (2016.01)

(52) U.S. Cl.
   CPC .......... *A23K 20/158* (2016.05); *A23K 20/163* (2016.05); *A23K 40/00* (2016.05); *A23K 40/10* (2016.05); *A23K 50/42* (2016.05); *A23L 5/15* (2016.08); *A23P 10/25* (2016.08); *A23P 20/10* (2016.08); *A23L 5/10* (2016.08); *A23P 10/20* (2016.08); *A23P 30/20* (2016.08)

(58) Field of Classification Search
   CPC ..... A23K 20/158; A23K 20/163; A23P 10/20; A23P 10/25; A23P 20/00; A23P 20/10; A23P 20/15; A23P 20/18; A23P 30/20; A23L 5/10; A23L 5/15; A23L 33/10; A23L 33/115; A23L 33/12
   See application file for complete search history.

(56) References Cited

U.S. PATENT DOCUMENTS

| | | | | |
|---|---|---|---|---|
| 4,822,626 | A * | 4/1989 | Spanier | A23K 40/20 426/293 |
| 5,304,055 | A * | 4/1994 | Van Lengerich | A21C 3/04 264/142 |
| 5,404,420 | A * | 4/1995 | Song | F24C 15/325 219/400 |
| 6,890,580 | B1 * | 5/2005 | Villagran | A23B 7/02 426/473 |
| 2001/0055636 | A1 * | 12/2001 | Geromini | A21C 11/163 426/89 |
| 2005/0181097 | A1 * | 8/2005 | Townsend | A23K 40/20 426/89 |
| 2006/0193945 | A1 * | 8/2006 | Dull | A23K 3/00 426/2 |
| 2009/0004356 | A1 * | 1/2009 | Bunke | A23L 7/13 426/550 |
| 2010/0062111 | A1 * | 3/2010 | Langford | A23N 17/005 426/61 |
| 2010/0330229 | A1 * | 12/2010 | Gelineau | A23K 50/40 426/2 |
| 2011/0052751 | A1 * | 3/2011 | Karutz | A23D 7/0053 426/2 |
| 2011/0104327 | A1 | 5/2011 | Kirejevas | |
| 2014/0010916 | A1 * | 1/2014 | Pibarot | A23K 1/10 426/19 |
| 2014/0134306 | A1 * | 5/2014 | Sakaji | A23K 1/1628 426/242 |
| 2014/0161962 | A1 * | 6/2014 | Boebel | A23K 1/1853 426/656 |
| 2015/0327573 | A1 * | 11/2015 | Uchii | A23K 40/00 426/656 |

FOREIGN PATENT DOCUMENTS

| | | | |
|---|---|---|---|
| JP | 2004-33095 A | 2/2004 | |
| JP | 2004-121022 A | 4/2004 | |
| JP | 3793845 B2 | 7/2006 | |
| JP | 2009-503146 A | 1/2009 | |
| JP | 2009189244 A * | 8/2009 | ............... A23K 1/18 |
| JP | 2011-90 A | 1/2011 | |
| WO | 2007/011965 A2 | 1/2007 | |
| WO | 2012/173078 A1 | 12/2012 | |

OTHER PUBLICATIONS

International Search Report for PCT/JP2013/075961 dated Dec. 24, 2013.

Office Action in CN Application No. 201380048684.6, dated Jul. 25, 2016.

Extended European Search Report in EP Application No. 13838554.7, dated Jun. 15, 2016.

* cited by examiner

PET FOOD AND METHOD OF MANUFACTURING PET FOOD

CROSS REFERENCE

The present application is a National Phase of International Application Number PCT/JP2013/075961, filed Sep. 18, 2013, and claims priority of Japanese Patent Application No. 2012-206863, filed Sep. 20, 2012, the content of which is incorporated herein by reference.

TECHNICAL FIELD

The present description relates to a pet food and a method of manufacturing a pet food. In some embodiments, the description relates to a pet food having improved palatability for pets, and a method of manufacturing the pet food.

BACKGROUND

In order to provide a comprehensive nutritional diet for pets, a method of manufacturing a pet food with palatability by granulating a pet food composition containing a blend of nutritionally balanced ingredients, heating the granules to alphatize the starch component and dry the granules, and then subjecting the granules to a frying treatment in oil at a temperature of not more than 180° C. has already been disclosed (Patent Document 1).

Further, a method of manufacturing a pet food in which a granulated pet food is molded into a flat plate shape using an extruder has also been disclosed (Patent Document 2). A flat plate-shaped pet food can be fed to a pet from the hand of the owner, and therefore satisfies both the owner and the pet.

The Maillard reaction is a reaction between sugars and proteins, which occurs upon heat processing and generates flavour compounds. Such flavour compounds include pyrazine compounds.

DOCUMENTS CITED

Patent Documents

[Patent Document 1] Japanese Unexamined Patent Application, First Publication No. Sho 64-39953
[Patent Document 2] Japanese Patent (Granted) Publication No. 3,793,845

SUMMARY

Problems Solvable

A technique in which a pet food is subjected to a frying treatment in oil in order to impart palatability has already been disclosed as a conventional method of manufacturing a pet food. However, a problem arises in that the calorific content of the pet food increases. In recent years, health awareness for pet food has also increased, and pet foods that are good for the health of the pet, as well as having excellent palatability are very desirable.

The present description has been developed in light of the above circumstances, and, in some embodiments, makes it possible to provide a highly palatable pet food that is formulated using a blend of ingredients having good nutritional balance with the health of the pet in mind, as well as a method of manufacturing the pet food.

Means to Solve One or More the Problems

A first aspect of the present description is the method of manufacturing a pet food described below. A second aspect of the description is the pet food described below.

(1) A method of manufacturing a pet food that includes granulating a mixture of ingredients, adding a first oil or fat to food granules thus prepared, subsequently baking the food granules, and then adding a second oil or fat, wherein the food granules contain a reducing sugar prior to baking, the amount added of the first oil or fat represents 0.5 to 8.0% by weight of a total weight of a combination of the mixture, the first oil or fat and the second oil or fat, and the combined amount added of the first oil or fat and the second oil or fat represents 5.0 to 13.0% by weight of the total weight of the pet food.

(2) A method of manufacturing a pet food that includes granulating a mixture of ingredients, adding a first oil or fat to food granules thus prepared, subsequently baking the food granules, and then adding a second oil or fat, wherein the amount added of the first oil or fat represents 2.0 to 10.0% by weight of a total weight of a combination of the mixture, the first oil or fat and the second oil or fat, and the combined amount added of the first oil or fat and the second oil or fat represents 5.0 to 13.0% by weight of the total weight of the pet food.

The mixture of ingredients in (1) and (2) includes ingredients conventionally contained in pet foods and comprises both carbohydrate and protein components.

Preferably, the reducing sugar of (1) is present in an amount of 0.1 to 5.0% of . . . .

Preferably, the reducing sugar comprises an oligosaccharide such as a monosaccharide or a disaccharide, examples of which are given herein.

The first oil or fat of (1) or (2) may be plant or animal based and may include conventional meal extracts as decried herein.

(3) The method of manufacturing a pet food disclosed above in (1) or (2), wherein the temperature during the baking is a temperature that generates pyrazines in the food granules.

(4) The method of manufacturing a pet food disclosed above in (3), wherein the baking is performed so that the pyrazine content within the food granules following baking is at least 0.10 ppm higher than the pyrazine content within the food granules prior to baking.

For example, the food granules may be heated at at least 150° C. for a period of from 5 to 200 seconds. Preferred baking methods and temperatures are described herein.

(5) The method of manufacturing a pet food disclosed above in (3) or (4), wherein the pyrazines include one or more compounds among 2,5-dimethylpyrazine, 2,6-dimethylpyrazine and 2,3,5-trimethylpyrazine.

Preferably, the combined amount of these pyrazines in the food granules following baking is in the range of from 0.30 ppm to 30 ppm.

(6) The method of manufacturing a pet food disclosed above in any one of (1) to (5), wherein the baking is performed using far infrared radiation.

(7) The method of manufacturing a pet food disclosed above in any one of (1) to (6), wherein during the granulating, food granules are obtained for which the shortest diameter and the longest diameter are both within a range from 3 mm to 30 mm.

Specific methods for achieving such food granules are described herein.

(8) The method of manufacturing a pet food disclosed above in any one of (1) to (7), wherein prior to adding the first oil or fat, the granulated food granules are dried by hot air at 70 to 90° C.

(9) The method of manufacturing a pet food disclosed above in any one of (1) to (8), wherein during the baking, far infrared radiation is irradiated to generate an atmospheric temperature of 160 to 230° C., thereby baking the food granules to which the first oil or fat has been added.

(10) The method of manufacturing a pet food disclosed above in (9), wherein the baking time is within a range from 20 seconds to 55 seconds.

(11) The method of manufacturing a pet food disclosed above in any one of (6) to (10), wherein during the baking, a ceramic heater is used as the irradiation source for the far infrared radiation, and baking is performed with the distance between the ceramic heater and the food granules to which the first oil or fat has been added set within a range from 80 mm to 120 mm.

(12) The method of manufacturing a pet food disclosed above in any one of (6) to (11), wherein during the baking, the food granules are transported on a mesh while the far infrared radiation is irradiated from at least one of above and below the mesh.

(13) The method of manufacturing a pet food disclosed above in any one of (1) to (12), wherein the water content within the food granules prior to baking is not more than 12.0% by weight of the total weight of the pet food.

Preferably, the water content within the food granules prior to baking is at least 3%.

(14) The method of manufacturing a pet food disclosed above in any one of (1) to (13), wherein during the granulating, the mixture is heated at a temperature of not more than 150° C.

Preferably, during the granulating, the mixture is heated at a temperature of at least 50° C.

Preferably, during the granulating, the mixture is heated for at least 1 minute.

Preferably, during the granulating, the mixture is heated for up to 20 minutes.

(15) The method of manufacturing a pet food disclosed above in any one of (1) to (14), wherein during the granulating, an extruder is used to granulate the mixture of ingredients and obtain food granules.

(16) The method of manufacturing a pet food disclosed above in any one of (1) to (15), wherein when the first oil or fat or the second oil or fat is added, the food granules are heated to at least 40° C., pressure is reduced in a state where the oil or fat is in contact with the surface of the food granules, and the pressure is then returned to atmospheric pressure.

Preferably, when the first oil or fat or the second oil or fat is added, the food granules are heated to a temperature of 40-80° C.

Preferably, the pressure is reduced in a state where the oil or fat is in contact with the surface of the food granules, to a pressure of 0.1-0.3 atmospheres.

(17) A pet food, manufactured by the method of manufacturing a pet food disclosed above in any one of (1) to (16).

The pet food disclosed above of (17) preferably includes pyrazines comprising one or more compounds among 2,5-dimethylpyrazine, 2,6-dimethylpyrazine and 2,3,5-trimethylpyrazine, in a combined amount of from 0.70 ppm to 30 ppm.

The water content of the pet food is preferably less than 8.0% by weight and at least 2.0% by weight of the total weight of the pet food.

The total fat content of the pet food is preferably not more than 22.0% by weight and at least 8.1% by weight of the total weight of the pet food.

Effects Achievable

According to a method of manufacturing a pet food, a pet food having good nutritional balance and excellent palatability (desirability) for pets can be manufactured. Further, because a favorable taste is achieved without performing a frying treatment in oil, a low calorie pet food can be manufactured. The pet food of the present description makes it possible to exhibit excellent palatability (desirability) for pets, and can therefore satisfy the desires of health-conscious owners.

EMBODIMENTS

Method of Manufacturing Pet Food

First Embodiment

Figure 1:
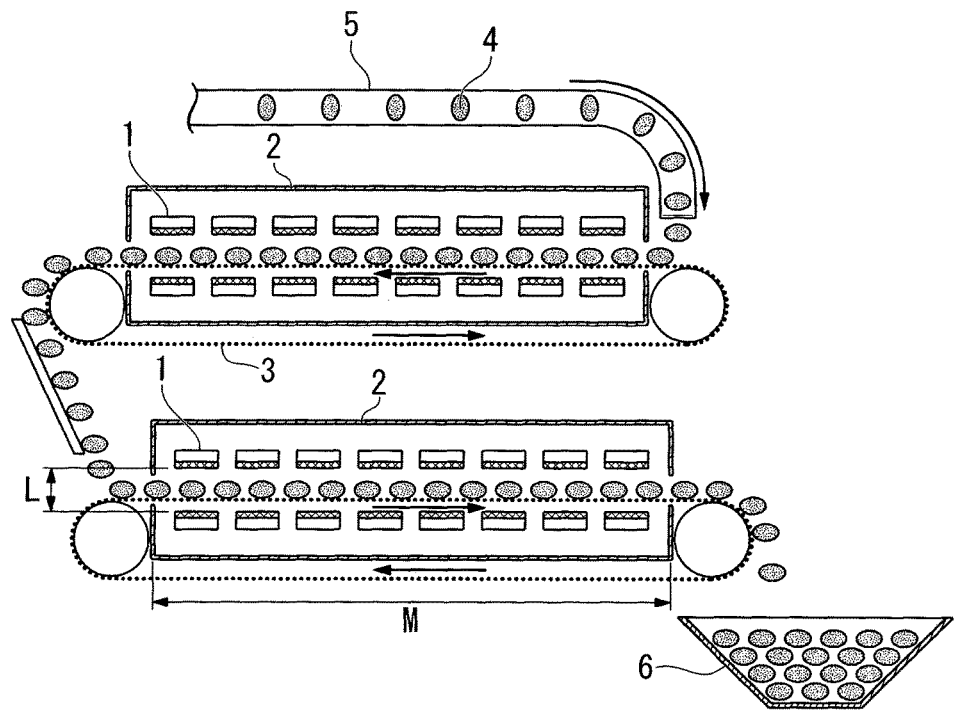
FIG. 1 is a schematic view illustrating one example of an embodiment of the manufacturing method.

A method of manufacturing a pet food according to a first embodiment is a method that includes granulating a mixture of ingredients, adding a first oil or fat to food granules thus prepared, subsequently baking the food granules, and then adding a second oil or fat.

In the first embodiment, the amount added of the first oil or fat represents 2.0 to 10.0% by weight of the total weight of a combination of the mixture, the first oil or fat and the second oil or fat, and the combined amount added of the first oil or fat and the second oil or fat represents 5.0 to 13.0% by weight of the total weight of the pet food.

Second Embodiment

A method of manufacturing a pet food according to a second embodiment is a method that includes granulating a mixture of ingredients, adding a first oil or fat to food granules thus prepared, subsequently baking the food granules, and then adding a second oil or fat.

In the second embodiment, the food granules contain a reducing sugar prior to baking, the amount added of the first oil or fat represents 0.5 to 8.0% by weight of the total weight of a combination of the mixture, the first oil or fat and the second oil or fat, and the combined amount added of the first oil or fat and the second oil or fat represents 5.0 to 13.0% by weight of the total weight.

The second embodiment is the same as the first embodiment, with the exceptions that the food granules in the second embodiment contain a reducing sugar prior to baking, and the fact that the lower limit for the amount added of the first oil or fat (0.5% by weight) is 1.5% by weight lower than the lower limit in the first embodiment (2.0% by weight).

The methods of manufacturing a pet food according to the first embodiment and the second embodiment each include at least a step of granulating a mixture of ingredients to obtain food granules (granulation step), a step of coating the granulated food granules with the first oil or fat (precoating step), a step of baking the food granules (baking step), and a step of coating the baked food granules with the second oil or fat (coating step).

In some embodiments, food granules are heated by frying in oil, but the oil content of the resulting food granules is sometimes excessive, and regulating the oil content has proven difficult. If the health of the pet is taken into consideration, then a pet food containing excessive oil or fat is undesirable.

In contrast, by baking the food granules, the oil content of the food granules obtained following baking is, in some embodiments, prevented from becoming excessively high. Because an amount of oil or fat that has been limited to a healthy amount can be added, the oil content of the pet food is regulated more easily. In other words, nutritional design of the pet food, such as the calorific content, is achievable more easily. Further, by performing baking, the taste and texture of the pet food is improvable.

By adding the first oil or fat to the granulated pet food, the surfaces of the food granules are coated with the first oil or fat, and the first oil or fat also penetrates into at least a portion of the interior of the food granules. By baking the food granules that have been subjected to this precoating step, the amount of pyrazines, which are fragrant components, is increasable. At this time, by regulating the amount added of the first oil or fat to at least a specified amount, the palatability for pets is increasable considerably.

Furthermore, by adding the second oil or fat following baking, the amount of fat sufficient for good maintenance of the health of the pet can be incorporated within the pet food.

In the second embodiment, a reducing sugar (for example, a monosaccharide such as glucose) is incorporated within the food granules prior to baking. By baking these food granules, a Maillard reaction occurs within the food granules and further improves the flavor of the pet food, and therefore the palatability is improvable significantly.

Although a detailed mechanism is still unclear, as illustrated in the examples described below, in the second embodiment in which a reducing sugar is added, from the viewpoint of improving the palatability, the amount added of the first oil or fat is, in some embodiments, reduced by approximately 1 to 5% by weight from the amount used in the first embodiment.

Each of the steps is described below.

<Granulation Step>

The granulation step is a step of granulating the mixture of ingredients to obtain food granules.

For the ingredients, the types of ingredients typically used as a complete source of nutrition for pet food is usable. The main nutrients contained within the ingredients are proteins and carbohydrates.

Examples of the proteins include plant-derived proteins, animal-derived proteins, and mixtures thereof. Specifically, examples of the plant-derived proteins include gluten, wheat protein, soy protein, rice protein, and corn protein. Examples of the animal-derived proteins include the proteins from the muscles and organs of beef, pigs, chickens and fish, milk protein, and mixtures thereof. These proteins also contain fats, vitamins and iron and the like, and can therefore be used as a nutritional source.

Examples of carbohydrates include carbohydrates from grains such as corn, wheat, barley, oats, rice and soybeans. In addition to carbohydrates, these grains also contain protein, ash, minerals and vitamins and the like, and can therefore be used as a nutritional source.

As the aforementioned ingredients, besides the proteins and carbohydrates mentioned above, vitamins and minerals, salts, fats, and animal protein extracts and the like, in some embodiments, is added to the aforementioned mixture.

For example, ingredients are mixed together using the formulation shown below in Table 1.

TABLE 1

|  | Formulation for cats | Formulation for dogs |
|---|---|---|
| Grains (such as corn, wheat flour, corn gluten meal or soybeans) | 55 to 75% | 65 to 85% |
| Meat (such as chicken meal, pork meal or chicken extract) | 10 to 25% | 7 to 20% |
| Fish (such as fish meal or fish extract) | 5 to 15% | 5 to 15% |
| Vitamins and minerals (individual vitamins for cats or dogs) | 2 to 5% | 2 to 5% |
| Total | 100% | 100% |

In the case of the second embodiment, a reducing sugar is included within the mixture of ingredients. This reducing sugar includes aldoses having an aldehyde group and ketoses having a ketone group, which are generated upon ring opening of a sugar having a cyclic structure. In some embodiments, the reducing sugar is capable of causing a Maillard reaction.

Examples of the reducing sugar include monosaccharides such as glucose, fructose and arabinose, disaccharides such as lactose and maltose, and other oligosaccharides.

The molecular weight of the reducing sugar is, in some embodiments, 1,000 or less, but reducing sugars having a molecular weight exceeding 1,000, in some embodiments, are included within isomerized sugar, which is one type of reducing sugar.

Although there are no particular limitations on the amount of the reducing sugar within the mixture, or the amount of the reducing sugar contained within the food granules following addition of the first oil or fat but prior to baking, the reducing sugar is, in some embodiments, added in an amount of 0.1 to 5.0% by weight of the total weight of the pet food (mixture/mixture+oil).

There are no particular limitations on the method used for mixing the reducing sugar into the mixture, and for example, the reducing sugar in a solid form or powdered form (for example, hydrated glucose) may simply be added to the ingredients and mixed.

The aforementioned mixture is obtained by mixing the ingredients in the desired blend ratio. During mixing, in some embodiments, water, vegetable oil, or animal oil or fat is/are added as appropriate. By adding these components, the ingredients, in some embodiments, are mixed more uniformly.

The method used for obtaining the mixture, in some embodiments, employs conventional methods in which the ingredients are crushed using a crusher, and then mixed using a mixer or the like.

There are no particular limitations on the method used for granulating the mixture, provided the method is able to mold the mixture into a shape that is suitable for consumption by pets, and for example, an extruder is ideal. In some embodiments, a conventional extruder capable of granulating the food mixture into granules of appropriate size is used. By using an extruder, the mixture, in some embodiments, is pressurized, which enables the hardness of the obtained food granules to be regulated.

In this description, the term "granulate" describes the process of molding the mixture into a shape that can be consumed by pets. In the present description, there are no particular limitations on the shape of the molded food granules, provided the shape is edible for pets, and any shape can be used, including spheres, polyhedral shapes, cylinders, donut shapes, flat plate shapes and disc shapes. Further, the size of the molded food granules may be small enough to enable the pet to eat a granule in a single mouthful, or may be large enough that the pet needs to bite into the granule a number of times.

Although there are no particular limitations on the shape of the food granules, in some embodiments, a disc shape in which the shortest diameter and the longest diameter are both within a range from 3 mm to 30 mm. By using this shape, heat conduction occurs favorably in the subsequent baking treatment, and a larger amount of pyrazines can be generated in the food granules.

Furthermore, the shape of the food granules, in some embodiments, is a plate shape, cylindrical shape or tube shape that is too large to be eaten by the pet. In this case, the granules are, in some embodiments, reduced in size to a shape that is readily edible for pets following either the subsequent drying treatment or the baking treatment.

In the granulation step, during the molding of the mixture to form the granules, the carbohydrates in the mixture, in some embodiments, are alphatized by performing a heat treatment. Performing alphatization has the effects of improving the taste and texture of the obtained food granules, as well as better promoting the generation of pyrazines in the baking treatment performed in the subsequent baking step.

Although there are no particular limitations on the temperature or time of the heating treatment performed during the granulation, in some embodiments, a temperature of not more than 150° C. is used, or a temperature of 50 to 120° C. is used, or a temperature of 80 to 100° C. is used. When heating is performed at this temperature, the length of time for the heating treatment is, in some embodiments, within a range from 1 to 20 minutes, or from 2 to 20 minutes, or from 3 to 6 minutes.

Provided the temperature is at least as high as the lower limit of the above temperature range (namely, 50° C.) and the time is at least as long as the lower limit of the above time range (namely, 1 minute), the effects described above can be achieved satisfactorily. Provided the temperature is not more than the upper limit of the above temperature range (namely, 150° C.) and the time is not longer than the upper limit of the above time range (namely, 20 minutes), excessive heating of the ingredients is avoidable.

In the granulation step, a treatment for drying the food granules, in some embodiments, is performed. By drying the granulated food granules, the first oil or fat can be coated satisfactorily onto the surface and interior of the food granules, and the generation of pyrazines in the subsequent baking step can be better promoted. Here, a description is presented for the case where the drying treatment is performed in the granulation step, but a drying step, in some embodiments, is provided separately from the granulation step.

<Drying Treatment>

There are no particular limitations on the method used for drying the food granules, and, in some embodiments, conventional methods such as a method of performing drying naturally, a method of performing drying by blowing hot air onto the granules, a method of performing drying under reduced pressure, or a method of performing drying by freeze-drying is/are used. Among these drying methods, the method in which drying is performed by blowing hot air onto the granules is also able to improve the taste of the pet food.

There are no particular limitations on the temperature of the food granules during drying or the temperature of the hot air blown onto the granules. These temperatures are, in some embodiments, not higher than 100° C., or from 60 to 90° C., or from 70 to 90° C. When drying is performed at these temperatures, the length of time for the drying treatment is, in some embodiments, from 1 to 120 minutes, or from 5 to 60 minutes, or from 10 to 30 minutes.

Provided the temperature is at least as high as the lower limit of the above temperature range (namely, 60° C.) and the time is at least as long as the lower limit of the above time range (namely, 1 minute), the food granules can be dried in a comparatively short time. Provided the temperature is not more than the upper limit of the above temperature range (namely, 100° C.) and the time is not longer than the upper limit of the above time range (namely, 120 minutes), excessive heating of the food granules is avoidable.

The temperature of the aforementioned heating treatment and the temperature of the drying treatment, in some embodiments, are the same or different.

Although there are no particular limitations on the water content of the food granules following the drying treatment but prior to baking, the water content is, in some embodiments, not more than 12.0% by weight, or from 3.0 to 10.0% by weight, or from 5.0 to 8.0% by weight of the total weight of the pet food.

By ensuring that the water content of the food granules is within the above range (namely, not more than 12.0% by weight), the first oil or fat can be coated satisfactorily onto the surface and interior of the food granules, and the amount of pyrazines generated within the food granules in the subsequent baking treatment can be further increased. Further, the taste and texture, in some embodiments, is improved.

<Precoating Step (First Oil or Fat Addition Step)>

The first oil or fat is added to the granulated food granules.

There are no particular limitations on the material of the first oil or fat that is added, and examples include animal-based oils and fats, and plant-based oils and fats. Specific examples of the animal-based oils and fats include beef tallow, pig lard, bird fat and fish fat. In some embodiments, meal extracts such as chicken extract (extract derived from chicken meat) and fish extract (extract derived from fish flesh) are also added to the first oil or fat.

There are no particular limitations on the method used for adding the first oil or fat to the granulated food granules. An example of a method that enables the entire surface of the food granules to be coated with the first oil or fat is a method in which an animal-based oil or fat that has been fluidized by heating and the food granules are stirred together within a coating reel. By maintaining a state, either during the stirring or after the stirring, in which the fluidized first oil or fat is adhered to the surfaces of the food granules for a specified time (for example, 1 to 30 minutes), at least a portion of the first oil or fat is able to penetrate into the interior of the food granules. The first oil or fat may penetrate into the central region of the food granules, or may only penetrate into a shallow region close to the surface of the food granules. From the viewpoint of further enhancing the heating efficiency in the subsequent baking step, the first oil or fat is, in some embodiments, made to penetrate into the interior of the food granules. Further, in some embodiments, in the precoating step, a vacuum coating method described below is applied as appropriate.

In the first embodiment, the amount added of the first oil or fat represents 2.0 to 10.0% by weight of the total weight of the combination of the aforementioned ingredient mixture prior to granulation, the first oil or fat and the second oil or fat. In the first embodiment, from the viewpoint of improving the palatability for cats, the amount added of the first oil or fat is, in some embodiments, within a range from 2.5 to 8.0% by weight, or from 4.5 to 7.5% by weight, or from 4.5 to 7.0% by weight, or from 4.5 to 6.5% by weight.

In the second embodiment, the amount added of the first oil or fat represents 0.5 to 8.0% by weight of the total weight of the combination of the aforementioned ingredient mixture prior to granulation, the first oil or fat and the second oil or fat. In the second embodiment, from the viewpoint of improving the palatability for cats, the amount added of the first oil or fat is, in some embodiments, within a range from 0.5 to 6.0% by weight, or from 0.5 to 5.0% by weight, or from 0.5 to 4.5% by weight, or from 1.0 to 4.0% by weight.

By coating at least a portion of the surfaces of the food granules with the first oil or fat, larger amounts of pyrazines can be generated during the subsequent baking. Further, because the heating efficiency of the baking improves, satisfactory heating (cooking) right through to the interior of the food granules can be achieved in a shorter period of time. By causing the first oil or fat to penetrate into the interior of the food granules, the heating efficiency of the baking can be further enhanced.

<Baking Step>

The baking step is a step of baking the food granules obtained in the precoating step.

In the present description, the term "baking" means heating the food granules in the air at a high temperature for a short period of time.

The baking temperature is, in some embodiments, a temperature that causes the generation of pyrazines in the food granules obtained following baking.

By performing the baking at a temperature that generates pyrazines, components that improve the palatability for pets can be produced within the food granules. Further, pyrazines can improve the palatability for pets.

The baking is, in some embodiments, performed at a temperature that causes the pyrazine content within the food granules obtained following baking to be at least 0.10 ppm higher than the pyrazine content within the food granules prior to baking. The baking is, in some embodiments, performed at a temperature that causes the pyrazine content within the food granules obtained following baking to be 0.10 ppm to 30 ppm higher than the pyrazine content within the food granules prior to baking, or the pyrazine content is 0.30 ppm to 30 ppm higher, or the pyrazine content is 0.70 ppm to 20 ppm higher, or the pyrazine content is 1.50 ppm to 10.0 ppm higher, or the pyrazine content is 3.00 ppm to 6.00 ppm higher.

By performing baking at a temperature that generates at least 0.10 ppm of pyrazines, larger amounts of those components that improve the palatability for pets can be produced within the food granules. Further, by incorporating at least 0.10 ppm of pyrazines within the food granules, pet palatability is further improvable.

In the present description and the claims, the term "pyrazines" refers to pyrazine, represented by the chemical formula $C_4H_4N_2$, and pyrazine derivatives in which one or more of the hydrogen atoms of pyrazine have each been substituted with an alkyl group of 1 to 6 carbon atoms. The alkyl group of 1 to 6 carbon atoms is linear, branched or cyclic, is, in some embodiments, a linear or branched alkyl group of 1 to 3 carbon atoms, and is, in some embodiments, a methyl group or ethyl group. The number of hydrogen atoms substituted is, in some embodiments, from 1 to 3.

By incorporating these pyrazines in a pet food, the palatability for pets is improvable.

The pyrazines are, in some embodiments, 2,5-dimethylpyrazine (2,5-DMP), 2,6-dimethylpyrazine (2,6-DMP) and/or 2,3,5-trimethylpyrazine (2,3,5-TMP). Food granules that have been baked so as to incorporate these pyrazines are able to further improve the palatability of the granules for pets.

The concentration (amount) of pyrazines within the food granules following baking is, in some embodiments, within a range from 0.30 ppm to 30 ppm, or from 0.70 ppm to 20 ppm, or from 1.50 ppm to 10.0 ppm, or from 3.00 ppm to 6.00 ppm. Here, the concentration of pyrazines refers to the combined amount of 2,5-DMP, 2,6-DMP and 2,3,5-TMP.

By ensuring that the pyrazine concentration is at least as high as the lower limit of the above range (namely, 0.30 ppm), the palatability for pets is further improvable.

By ensuring that the pyrazine concentration is not more than the upper limit of the above range (namely, 30 ppm), the fragrance (smell) of the pyrazines can be prevented from becoming overly powerful.

The baking temperature and the baking time, in some embodiments, is set appropriately in accordance with the shape and size of the food granules, so as to increase the amount of pyrazines within the food granules following baking, and improve the taste and texture of the food granules (pet food).

For example, the food granules are, in some embodiments, heated in an atmosphere exceeding 150° C. for a period of 5 to 200 seconds.

There are no particular limitations on the method used for baking the food granules, and one example is a method in which the food granules are arrayed on a mesh, and heat rays or hot air is then projected onto the granules from above and/or below the mesh. The irradiation source for the heat rays or the hot air is, in some embodiments, a ceramic heater that generates far infrared radiation, and more specifically, is ideally a ceramic heater that is heated by a gas burner.

By baking the aforementioned food granules using far infrared radiation, the improvement in the efficiency of the generation of pyrazines arising from the addition of the first oil or fat can be further enhanced. In addition, in the case of the second embodiment, using far infrared radiation enables the increase in favorable taste arising from the Maillard reaction to be further enhanced.

Further, by baking the food granules using far infrared radiation, the granules can be heated through to the interior more quickly than is possible with grilling or roasting. As a result, the heating equipment can be simplified, and equipment expenditure can be kept to a minimum. Furthermore, by performing heating using far infrared radiation, the water content of the food granules following baking can be regulated more easily, the taste and texture of the pet food can be improved, and a pet food that exhibits excellent palatability for pets can be obtained.

On the other hand, in terms of other baking methods, in those cases where the food granules are grilled using a flame or roasted, the heating time sometimes is lengthened in order to ensure thorough heating is achieved through to the interior of the food granules. In such cases, if an industrial production line is used, then the line length increases, causing a problem of increased equipment costs.

(First Baking Method)

In terms of the baking temperature and the baking time, one example involves heating the food granules by exposing them to an atmosphere of at least 250° C. for 5 to 200 seconds. Specifically, in some embodiments, investigations are conducted within a temperature range from 250° C. to 380° C. and within a time range of 5 to 200 seconds. Provided the food granules prior to baking are of typical shape and size, the baking temperature is, in some embodiments, from 270 to 370° C., or from 270 to 350° C., or from 280 to 330° C. In this case, the baking time is, in some embodiments, within a range from 5 to 90 seconds, or from 10 to 75 seconds, or from 20 to 75 seconds, or from 20 to 45 seconds.

By ensuring that the baking temperature and the baking time are at least as large as the respective lower limits described above, larger amounts of pyrazines and/or components that are attractive to pets can be generated within the food granules obtained by following baking. By ensuring that the baking temperature and the baking time are not more than the respective upper limits described above, the generation of substances responsible for burnt odors and the like, which pets dislike, can be suppressed.

The above expression that the food granules prior to baking are of typical shape and size means that the shape of the granules is spherical, polyhedral, cylindrical, donut-shaped, flat plate-shaped or disc-shaped or the like, and the granules have a size with a shortest diameter of approximately 3 to 30 mm, and a longest diameter of approximately 5 to 150 mm.

The shape of the food granules prior to baking is, in some embodiments, a disc shape in which the shortest diameter and the longest diameter are both within a range from 3 mm to 30 mm. By using this shape, heat conduction occurs favorably during the baking treatment, and a larger amount of pyrazines can be generated in the food granules.

(Second Baking Method)

In those cases where the food granules are baked by irradiating the granules with far infrared radiation, from the viewpoint of improving the taste and texture, the food granules are, in some embodiments, baked using a method in which irradiation of the far infrared radiation generates an atmospheric temperature of 160 to 230° C.

An example of a method of baking the food granules by irradiating the granules with far infrared radiation is a method in which the food granules are placed in an oven under an atmosphere (air atmosphere) of 160 to 230° C. while far infrared irradiation is performed. In this case, for example, far infrared irradiation is performed to raise the temperature of the oven prior to introduction of the food granules (the temperature of the empty oven) to 200° C. to 330° C., and the food granules are then transported into the oven (atmosphere), thereby irradiating the food granules with far infrared radiation and enabling baking to be performed at an atmospheric temperature of 160° C. to 230° C. One example of the method used to form an atmosphere in which far infrared irradiation has been performed to raise the temperature of the oven prior to introduction of the food granules to 200° C. to 330° C. is a method in which the temperature setting of the far infrared irradiation device used is set to 280° C. to 330° C. When the food granules are transported into an atmosphere that has been heated to 200° C. to 330° C. in an empty state, the atmosphere is cooled as a result of the introduction of the food granules and external air, and the temperature decreases to approximately 160° C. to 230° C. When the food granules can be heated stably at 160° C. to 230° C., the temperature setting of the device, in some embodiments, is set to 160° C. to 230° C. The temperatures mentioned in the above examples are shown below in Table 2.

TABLE 2

|  | Atmospheric temperature | Temperature setting of far infrared irradiation device |
| --- | --- | --- |
| Prior to introduction of food granules (empty oven) | 200 to 330° C. | 280 to 330° C. |
| Following introduction of food granules (during continuous introduction of the food granules) | 160 to 230° C. | 160 to 230° C. |

When the food granules are baked by performing far infrared irradiation so that the atmospheric temperature reaches 160 to 230° C., the baking time, in some embodiments, is adjusted appropriately in accordance with the size of the food granules. For example, in the case described above in which the shortest diameter and the longest diameter of the food granules are both within a range from 3 mm to 30 mm, the heating time is, in some embodiments, within a range from 20 seconds to 55 seconds. By employing these heating conditions, thorough heating through to the interior of the food granules can be achieved, and the taste and texture of the granules can be further improved. In contrast, if the temperature is less than 160° C. or the baking time is less than 20 seconds, then the interior of the food granules may remain partly cooked, resulting in unsatisfactory taste and texture. Further, if the baking time exceeds 55 seconds, then the surfaces of the food granules may become badly burnt, causing an unpleasant burnt odor.

In order to enable the far infrared radiation to be irradiated onto the food granules with good efficiency, a method in which the food granules are placed on a mesh and the far infrared radiation is then irradiated onto the food granules from above and/or below the mesh is, in some embodiments, used. By using this method, the lower portions of the food granules can be heated more efficiently than a method in which the food granules are placed on a metal plate and irradiated from above with far infrared radiation.

In one specific example of the method, as illustrated in FIG. 1, a metal mesh having the food granules placed thereon is transported using a net conveyor while far infrared radiation is irradiated onto the food granules from above and below the mesh. The heating time of the food granules can be adjusted by regulating the transport speed of the food granules.

Figure 2:
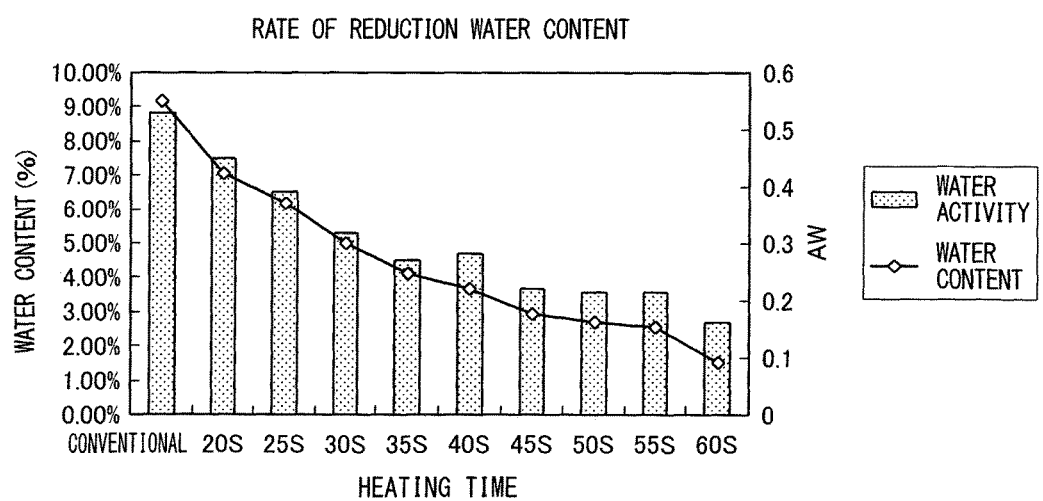
FIG. 2 is a graph illustrating the water content (wt %) and the water activity (AW) of food granules obtained when the heating time is varied.

A graph illustrating the water content (wt %) and the water activity (AW) of the food granules obtained when the speed of the net conveyor used for transporting the food granules is adjusted to change the heating time is shown in FIG. 2. The water content and the water activity both decrease as the heating time is lengthened, namely as the transport speed is reduced.

A heated ceramic or quartz, or a combusting carbon or the like can be used as the irradiation source of the far infrared radiation. Far infrared radiation is emitted from a ceramic or quartz that has been heated with a gas flame or an electrically heated wire or the like, and this far infrared radiation can then be irradiated onto the food granules. The use of a ceramic heater is, in some embodiments, used, as it exhibits excellent durability and enables the irradiation of powerful far infrared radiation. From the viewpoints of investment in equipment and running costs, a gas flame is, in some embodiments, used as the method for heating the ceramic.

Although there are no particular limitations on the distance between the ceramic heater that emits the far infrared radiation and the food granules, the distance is, in some embodiments, within a range from 80 to 120 mm or from 90 to 110 mm. When the separation distance satisfies this range, the food granules can be heated more reliably through to the interior of the granules, while there is no chance of badly burning the surfaces of the granules. In FIG. 1, L represents the distance between ceramic heaters.

<Coating Step (Second Oil or Fat Addition Step)>

The second oil or fat is added to the food granules obtained following baking. By adding the second oil or fat, the palatability for pets can be improved, and the calorie count of the pet food can be increased as desired. Further, by coating the baked food granules with the second oil or fat, an effect is obtained wherein the pyrazines generated within the baked food granules can be sealed inside the food granules, meaning the taste of the manufactured pet food can be stably maintained over long periods. Furthermore, those components generated within the food granules by baking that improve the taste of the granules, in some embodiments, is sealed inside the food granules, and therefore the taste of the manufactured pet food, in some embodiments, is stably maintained over long periods.

The amount added of the second oil or fat depends on (varies in tandem with) the amount added of the first oil or fat. In other words, the combined amount added of the first oil or fat and the second oil or fat represents 5.0 to 13.0% by weight of the total weight of the combination of the ingredient mixture prior to granulation, the first oil or fat and the second oil or fat, and therefore the amount added of the second oil or fat is equal to the combined amount added minus the amount added of the first oil or fat.

There are no particular limitations on the material of the second oil or fat that is added, and for example, the same materials as those mentioned above for the first oil or fat can be used. There are also no particular limitations on the method used for adding the second oil or fat to the baked food granules. The same addition methods as those described above for the first oil or fat, in some embodiments, is employed. Further, a vacuum coating method, in some embodiments, is used. A vacuum coating method is an ideal method for coating an oil or fat or the like onto food granules, and is a method in which, by reducing the pressure in a state where the oil and fat is in contact with, or adhered to, the heated food granules, the oil or fat are not only coated onto the surface of the food granules, but also penetrated into the interior of the granules. In those cases where the oil or fat is only adhered to the surface of the food granules, the oil or fat may detach from the food granules when the granules scrape against one another following manufacture. On the other hand, by causing the oil or fat to penetrate into the interior of the food granules, this detachment of the oil or fat from the food granules, in some embodiments, is reduced.

The heating performed during addition of the oil or fat to the food granules is mainly for the purpose of preventing solidification of the oil or fat. There are no particular limitations on the heating temperature, provided the temperature is able to achieve this objective. The heating temperature during addition of the oil or fat to the food granules is, in some embodiments, at least 40° C. From the viewpoint of preventing oxidation of the oil or fat, the temperature is, in some embodiments, as low as possible, and for example, the temperature is set within a range from 40 to 80° C.

There are no particular limitations on the degree of the aforementioned reduction in pressure, provided the oil or fat, in some embodiments, is incorporated inside the food granules. The reduction in pressure, in some embodiments, is adjusted appropriately in accordance with the size and hardness of the food granules, and for example, the pressure is reduced to 0.1 to 0.3 atmospheres.

The ratio of the oil or fat added to the food granules is adjusted appropriately in accordance with the designed calorific level, and for example, the oil or fat is added in a ratio that yields a total weight of fat components (total fat content) that represents 5 to 20% by weight of the total weight of the manufactured pet food. Here, the total fat content refers to the amounts added of the first oil or fat and the second oil or fat, plus any fat components already present within the ingredients prior to granulation.

The main components of these "fats" and "oils or fats" are typically glycerol esters of fatty acids (neutral fats).

Figure 3:
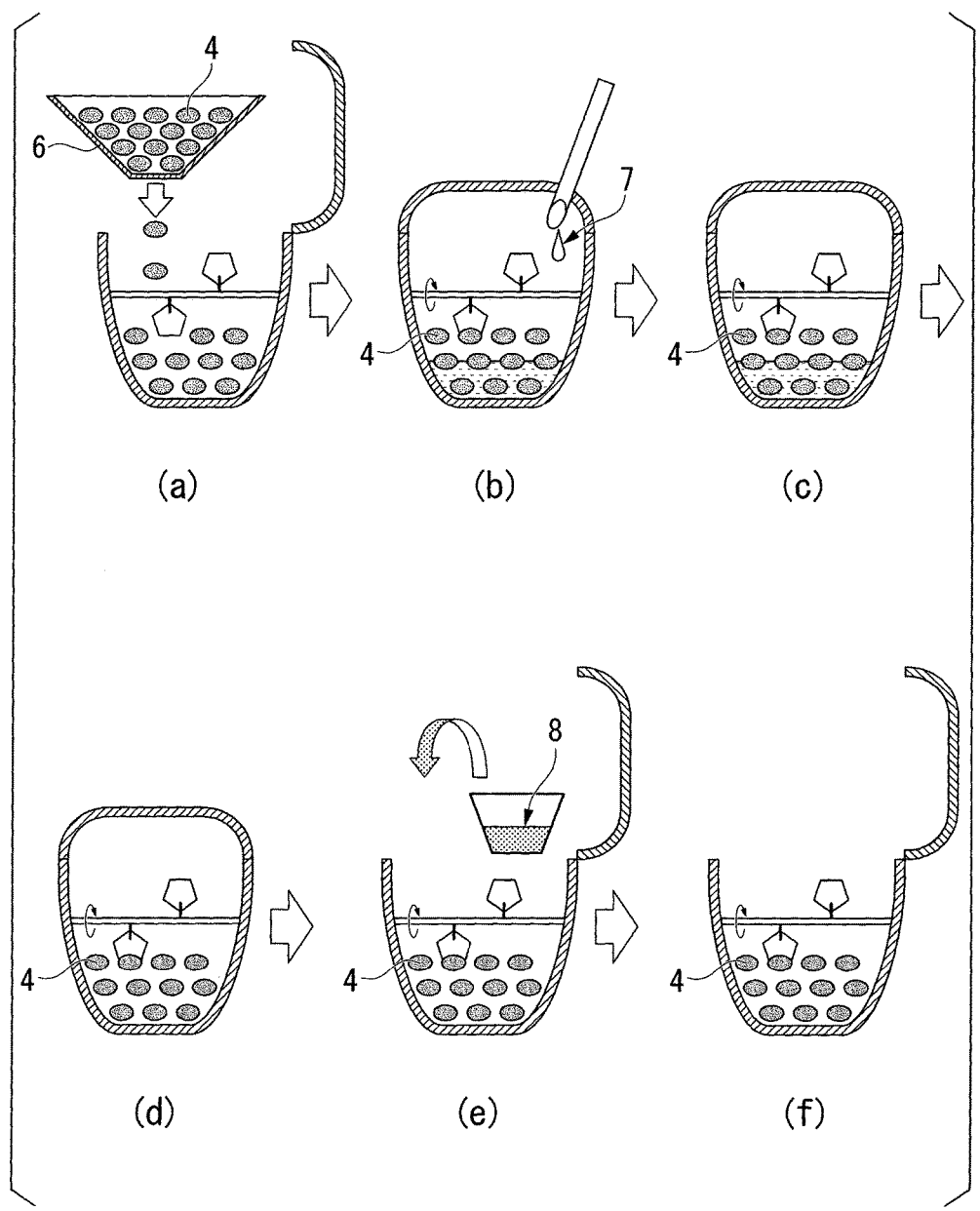
FIG. 3 is a schematic view illustrating one example of an embodiment of a vacuum coating method. according to some embodiments.

A specific example of the addition of a fat or oil to the food granules using a vacuum coating method is described below with reference to FIG. 3. The steps shown in FIG. 3 include (a) introduction of granules into a kettle, (b) sealing of the kettle, followed by introduction of beef tallow, and subsequent mixing under heat, (c) reduction of pressure inside the kettle, (d) subsequent release of the pressure to atmospheric pressure, (e) lid opening, and introduction of pet flavoring, and (f) removal from kettle and packaging.

Specifically, first (a) food granules 4 are introduced into a kettle fitted with stirring fins, and (b) following sealing of the kettle and introduction of an oil or fat (beef tallow 7), mixing is performed while the temperature is heated to approximately 40° C. Next, (c) the pressure inside the kettle is reduced to approximately 0.2 atmospheres under constant stirring, and (d) the pressure is then released gradually back to atmospheric pressure, for example over a period of 1 to 5 minutes, and, in some embodiments, the period is from 1 to 3 minutes. Subsequently, where desired, (e) pet flavoring 8 is added to the kettle and mixed for approximately 2 minutes, and (f) the granules are then transported to a packaging step. By performing the release to atmospheric pressure gradually, the oil or fat is, in some embodiments, incorporated uniformly into the interior of the food granules.

<Method of Measuring Pyrazine Content>

The pyrazine content within the food granules and the pet food is measured using a gas chromatograph-mass spectrometry method. Specifically, measurement using the solvent extraction method described below is, in some embodiments, used. The pyrazine content values reported in the present description refer to numerical values measured using this solvent extraction method.

(Solvent Extraction Method)

A pet food sample of 2 to 10 g is immersed in 50 ml of water and 20 ml of diethyl ether, the sample is stirred with a homogenizer under ice cooling, 20 g of sodium chloride is added, and following performing extraction by shaking for 10 minutes, a centrifugal separation is performed for 5 minutes at 2,000 rpm. The diethyl ether layer is dewatered and filtered, and subsequently concentrated to 4 ml to obtain a test solution. A specified amount of this test solution is injected into a gas chromatograph-mass spectrometer, the mass spectrum is obtained for the peaks in the gas chromatogram corresponding with the pyrazines, and the substances in the sample are identified. Based on the obtained gas chromatogram, the amount of pyrazines within the sample is calculated. For example, if food granules that have undergone a baking treatment and food granules that have not undergone a baking treatment are measured as test samples, then the pyrazine content of the respective granules is measured. Ideal conditions for the measurements are described below.

(Operating Conditions for Gas Chromatograph-Mass Spectrometer)

Apparatus: 6890N/5975B inert XL [Agilent Technologies, Inc.], column: DB-WAX [Agilent Technologies, Inc.] Ø0.25 mm×30 m, film thickness 0.25 µm, injection volume: 1 µl, injection system: split (1:5), temperature: sample injection port 220° C., column 60° C. (hold for 1 minute)→temperature increase at 10° C./minute→220° C., gas flow rate: helium (carrier gas) 1 ml/minute, ion source temperature: 230° C., ionization method: EI, set mass values: m/z=108.42 (2,5-DMP and 2,6-DMP), m/z=122.42 (2,3,5-TMP).

<<Pet Food>>

The pet food manufactured using the method of manufacturing a pet food according to the first embodiment or the second embodiment, in some embodiments, contains at least 0.70 ppm of pyrazines.

Here, the term "pyrazines" refers to pyrazine, represented by the chemical formula $C_4H_4N_2$, and pyrazine derivatives in which one or more of the hydrogen atoms of pyrazine have each been substituted with an alkyl group of 1 to 6 carbon atoms.

The alkyl group of 1 to 6 carbon atoms is linear, branched or cyclic, is, in some embodiments, a linear or branched alkyl group of 1 to 3 carbon atoms, and is, in some embodiments, a methyl group or ethyl group. The number of hydrogen atoms substituted is, in some embodiments, from 1 to 3.

By incorporating at least 0.70 ppm of these pyrazines, the palatability of the pet food for pets is, in some embodiments, improved.

The concentration of pyrazines contained within the pet food is, in some embodiments, within a range from 0.70 ppm to 30 ppm, or from 1.00 ppm to 20 ppm, or from 1.50 ppm to 10.0 ppm, or from 3.00 ppm to 6.00 ppm. Here, the concentration of pyrazines refers to the combined amount of 2,5-DMP, 2,6-DMP and 2,3,5-TMP.

By ensuring that the pyrazine concentration is at least as high as the lower limit of the above range (namely, 0.70 ppm), the palatability for pets is, in some embodiments, further improved.

By ensuring that the pyrazine concentration is not more than the upper limit of the above range (namely, 30.0 ppm), the fragrance (smell) of the pyrazines can be prevented from becoming overly powerful.

The water content of the pet food is, in some embodiments, less than 8.0% by weight, or from 2.0 to 6.0% by weight, or from 2.0 to 5.0% by weight.

By ensuring that the water content of the pet food is at least as high as the lower limit of the above range (namely, 2.0% by weight), the pet food can be prevented from becoming excessively hard, or becoming so excessively brittle that the shape cannot be retained.

Further, by ensuring that the water content of the pet food is less than 8.0% by weight, or not more than the upper limit of the above range, the pyrazines can more easily evaporate at an appropriate level, thereby ensuring a favorable taste for the pet food, and improving the palatability for pets.

The total fat content of the pet food is, in some embodiments, not more than 22.0% by weight. Although there are no particular limitations on the lower limit, considering the basis for a comprehensive nutritional diet, the total fat content is, in some embodiments, at least 8.1%.

By ensuring that the total fat content satisfies the above range, the calorie count and cholesterol content of the pet food is, in some embodiments, reduced, which contributes to the health of the pet. Further, when the total fat content is not more than 22.0% by weight, the compatibility between the texture of the pet food and the fragrance of the pyrazines contained in the pet food improves, meaning the palatability for pets is, in some embodiments, improved.

The pet food of the present description is manufactured using, in some embodiments, conventional ingredients, by the method described above.

The pet food of the present description is eaten by choice by all non-plant animals, and is liked by cats and dogs, and particularly liked by cats.

In order to inform pet owners that the pet foods of the first embodiment and the second embodiment are pet foods particularly suitable for cats, when the pet foods are packaged and placed on sale, they may be sold with a label indicating that the pet food is suitable for cats displayed appropriately on the packaging.

In the present description and the claims, the term "pet" describes an animal that is raised by people. In a more strict definition, a pet is an animal that is cherished by its owner. Further, "pet food" is food for a pet. The pet food manufactured using the method of manufacturing a pet food according to the present description can also be sold as "animal feed".

EXAMPLES

Embodiments are described below in further detail using a series of examples, but the present invention is in no way limited by the following examples.

Pet Food Manufacture (1)

Examples A and B, and Comparative Example C

Using the blend ratios shown in Table 3, grains, meat, fish, vitamins and minerals, and a reducing sugar (hydrated glucose) were crushed in a crusher and then mixed in a mixer to obtain ingredient mixtures.

The grains included corn, wheat flour, corn gluten meal, or soybeans or the like. The meat included chicken meal or pork meal or the like. The fish contained fish meal or the like.

TABLE 3

|  | Comparative Example C | Example A | Example B |
|---|---|---|---|
| Grains | 58 | 58 | 53.0 to 57.9 |
| Meat | 13 | 13 | 13 |

TABLE 3-continued

|  | Comparative Example C | Example A | Example B |
|---|---|---|---|
| Fish | 12 | 12 | 12 |
| Vitamins and minerals | 2 | 2 | 2 |
| Hydrated glucose | 0 | 0 | 0.1 to 5.0 |
| Total (parts by weight) | 85 | 85 | 85 |

Each of the obtained mixtures was granulated using an extruder to produce disc-shaped food granules having a diameter and height (thickness) of 3 mm to 30 mm. At this time, a heat treatment was performed at 80 to 100° C. for 3 to 6 minutes, thereby alphatizing the starch component.

The thus obtained food granules were subjected to a drying treatment, using a dryer, under a hot air stream at 70 to 90° C. for 10 to 30 minutes, thus yielding dry food granules of Example A, Example B and Comparative Example C.

Next, using each of the obtained dry food granules, a first oil or fat (beef tallow 1) was added in the weight ratio shown in Table 4 or 5 to coat the surfaces of the dry food granules. Moreover, the first oil or fat also penetrated from the surface into the interior of the dry food granules. This coating makes it possible to minimize the generation of fine powder (dust) from the dry food granules.

The external additive shown in Tables 4 and 5 is a mixture containing a fish extract and a yeast extract.

Next, as is illustrated schematically in FIG. 1, the food granules 4 that had been surface-coated with the first oil or fat (beef tallow 1) were placed on a metal mesh and transported by a net conveyor 3, and inside an oven 2 fitted with ceramic heaters 1, far infrared radiation was irradiated from above and below the mesh to bake the food granules 4. Specifically, the temperature inside the oven 2 prior to introduction of the food granules 4 (the temperature of the empty oven) was set within a range from 240 to 260° C., the temperature inside the oven 2 during the continuous introduction of the food granules 4 (the temperature during granule transport) was within a range from 190 to 210° C., and the transport speed of the mesh by the net conveyor 3 was adjusted so that each single food granule was subjected to a baking time of 30 seconds. During baking, the separation distance between the ceramic heaters 1 and the food granules 4 was set to approximately 100 mm. The temperature inside the oven 2 (atmospheric temperature) was monitored using a thermometer installed in a position located 30 mm above the mesh, 350 mm from the edge of the mesh, and 95 mm from the central region of the ceramic heaters 1. Following baking, the food granules 4 transported out of the oven 2 were cooled naturally in air while traveling along the net conveyor 3.

Subsequently, the baked food granules 4 were placed in a kettle and heated to at least 40° C., and with the granules undergoing constant mixing, a second oil or fat (beef tallow 2) was added in the weight ratio shown in Table 4 or 5, the pressure inside the kettle was reduced to 0.2 atmospheres, and the pressure was then returned to atmospheric pressure over a period of approximately 2 minutes, thus coating the surfaces of the food granules 4 with the second oil or fat. Moreover, the second oil or fat also penetrated from the surface into the interior of the food granules 4. During this process, an external additive containing a fish extract and a yeast extract was mixed with the second oil or fat, and was added to the food granules 4 together with the second oil or fat.

By employing the manufacturing method described above, pet foods of Examples A-1 to A-7 containing the added first oil or fat and second oil or fat in specified ratios, pet foods of Examples B-0 to B-7 which also contained a reducing sugar, and a pet food of Comparative Example C were obtained.

<Palatability Evaluation (1)>

The palatability (desirability) of the pet foods of Example A, Example B and Comparative Example C were evaluated using the method described below. The results are shown in Tables 4 and 5. The evaluation method was as follows.

First, 16 pairs of pet foods were prepared, including pairs of each of Examples A-1 to A-7 with Comparative Example C (a subtotal of 7 pairs), pairs of each of Examples B-0 to B-7 with Comparative Example C (a subtotal of 8 pairs), and a pair composed of two samples of Comparative Example C. Each pair was tested over two days using either 10 or 20 cats as monitors.

On the first day, each cat was provided with 70 g of each of the pair of pet foods, with the first pet food supplied from the left and the second pet food supplied from the right, and the amount of each pet food eaten by the cat was measured after one hour.

Based on the total weight of pet food consumed by the cat on the first day, the amount consumed of the pet food of the example and the amount consumed of the pet food of the comparative example were determined as percentages. The percentages obtained for the 10 or 20 cats being monitored were averaged to obtain the first day results.

On the second day, each cat was provided with 70 g of each of the pair of pet foods, with the first pet food supplied from the right and the second pet food supplied from the left, and the amount of each pet food eaten by the cat was measured after one hour.

Based on the total weight of pet food consumed by the cat on the second day, the amount consumed of the pet food of the example and the amount consumed of the pet food of the comparative example were determined as percentages. The percentages obtained for the 10 or 20 cats being monitored were averaged to obtain the second day results.

Finally, the results for the first day and the second day were averaged, and the consumption ratio that represents the final result (palatability) was determined. A higher numerical value for this palatability indicates greater consumption by choice by the monitored cats.

In Tables 4 and 5, a higher value for the palatability score indicates better palatability. For example, the palatability score for Example A-4 was 63. This result means that the palatability score for Comparative Example C provided at the same time was 100−63=37.

Further, in Tables 4 and 5, the palatability score for Comparative Example C was 50. This result indicates that when the pair of pet foods of Comparative Example C were provided, because the pet foods were identical, no difference was observed in the palatability.

TABLE 4

(Amounts added of oils or fats in Examples A-1 to A-7 and Comparative Example C)

|  | Beef tallow 1 | Beef tallow 2 | External additive | Total (parts by weight) | Palatability score |
|---|---|---|---|---|---|
| Example A-1 | 2.5 | 10.5 | 2.2 | 15.2 | 59 |
| Example A-2 | 3.5 | 9.5 | 2.2 | 15.2 | 57 |
| Example A-3 | 4.0 | 9.0 | 2.2 | 15.2 | 54 |

TABLE 4-continued (Amounts added of oils or fats in Examples
A-1 to A-7 and Comparative Example C)

|  | Beef tallow 1 | Beef tallow 2 | External additive | Total (parts by weight) | Palatability score |
|---|---|---|---|---|---|
| Example A-4 | 5.0 | 8.0 | 2.2 | 15.2 | 63 |
| Example A-5 | 6.0 | 7.0 | 2.2 | 15.2 | 63 |
| Example A-6 | 7.0 | 6.0 | 2.2 | 15.2 | 57 |
| Example A-7 | 8.0 | 5.0 | 2.2 | 15.2 | 51 |
| Comparative Example C | 1.5 | 11.5 | 2.2 | 15.2 | 50 |

TABLE 5

(Amounts added of oils or fats in Examples
B-0 to B-7 and Comparative Example C)

|  | Beef tallow 1 | Beef tallow 2 | External additive | Total (parts by weight) | Palatability score |
|---|---|---|---|---|---|
| Example B-0 | 0.5 | 12.5 | 2.2 | 15.2 | 60 |
| Example B-1 | 1.0 | 12.0 | 2.2 | 15.2 | 64 |
| Example B-2 | 2.0 | 11.0 | 2.2 | 15.2 | 59 |
| Example B-3 | 4.0 | 9.0 | 2.2 | 15.2 | 63 |
| Example B-4 | 5.0 | 8.0 | 2.2 | 15.2 | 59 |
| Example B-5 | 6.0 | 7.0 | 2.2 | 15.2 | 54 |
| Example B-6 | 7.0 | 6.0 | 2.2 | 15.2 | 58 |
| Example B-7 | 8.0 | 5.0 | 2.2 | 15.2 | 51 |
| Comparative Example C | 1.5 | 11.5 | 2.2 | 15.2 | 50 |

Based on the above results, it is clear that Example A in which the first oil or fat was added in a ratio exceeding 2% by weight exhibited superior palatability to Comparative Example C, and Examples A-4 and A-5 exhibited particularly marked improvements in the palatability. Accordingly, it can be said that the amount added of the first oil or fat is most, in some embodiments, within a range from 4.5 to 6.5% by weight.

Further, it is also clear that Example B in which the reducing sugar and the first oil or fat were added in amounts of at least 0.5% by weight exhibited superior palatability to Comparative Example C, and Examples B-0 to B-3 exhibited particularly marked improvements in the palatability. Accordingly, it can be said that in those cases where a reducing sugar is incorporated within the food granules prior to baking, the amount added of the first oil or fat is, in some embodiments, within a range from 0.5 to 4.5% by weight.

Comparing Example A and Example B, in Example A the palatability reached a peak when the amount added of the first oil or fat was from 4.5 to 6.5% by weight, whereas in Example B the palatability reached a peak when the amount added of the first oil or fat was from 0.5 to 4.5% by weight. A graph comparing the palatability results is shown in FIG. 4.

Figure 4:
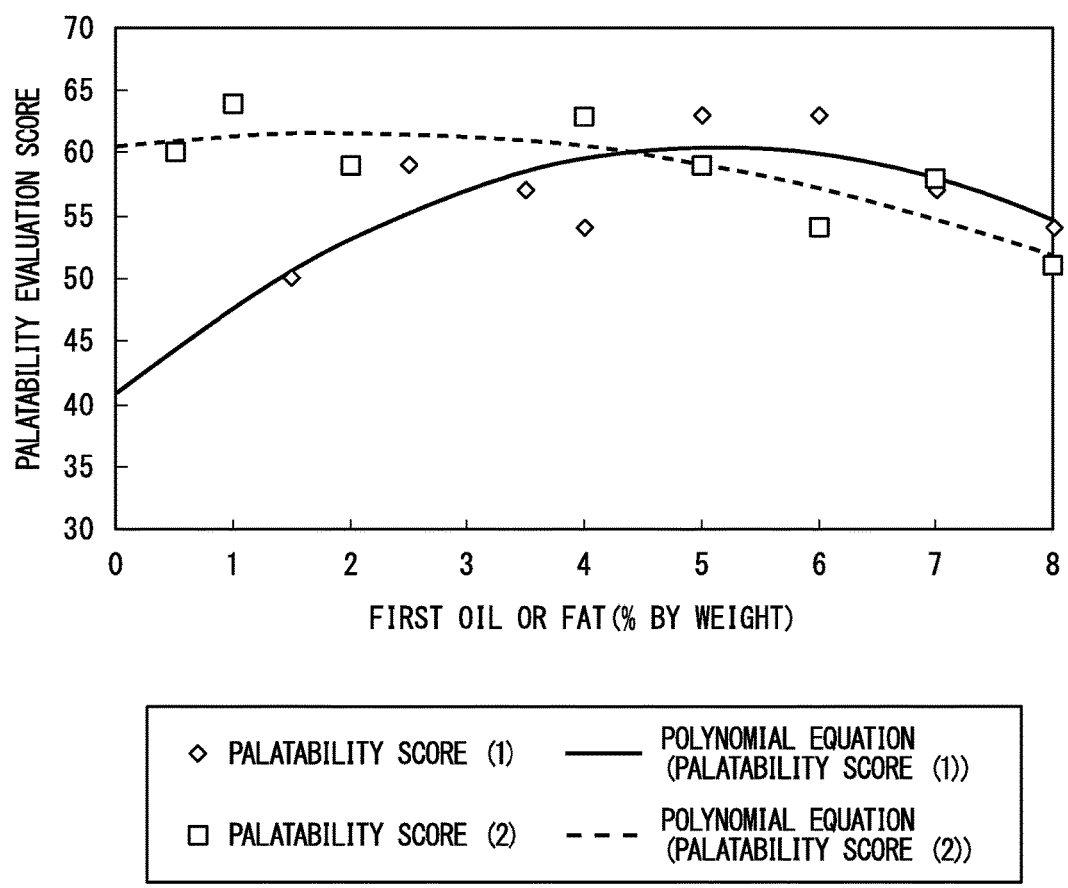
FIG. 4 is a graph comparing the palatability of an Example A and an Example B.

In FIG. 4, the results of Example A are represented by the plots of the palatability score (1), and the results of Example B are represented by the plots of the palatability score (2). The palatability evaluation score relative to the amount added of the first oil or fat can be represented by a polynomial equation, and the results in Example A and Example B are shown as quadratic approximation curves. In FIG. 4, the solid line represents the quadratic approximation curve for the plots of Example A ($y=-0.7345x^2+7.5815x+40.935$; $R^2=0.5557$), and the dashed line represents the quadratic approximation curve for the plots of Example B ($y=-0.2705x^2+1.0804x+60.578$; $R^2=0.6732$).

Based on the results shown in the graphs, it is evident that by incorporating a reducing sugar in the food granules prior to baking, the amount added of the first oil or fat can be reduced by approximately 2 to 6%. This indicates that by reducing the amount added of the first oil or fat without altering the amount added of the second oil or fat, the total fat content within the pet food can be reduced.

As illustrated by the results of Example A and Example B, Example B is able to achieve a similar palatability score to Example A, despite having a smaller amount of the first oil or fat than Example A. The reason for this observation is assumed to be that a Maillard reaction of the reducing sugar results in an improvement in the taste of the pet food.

<Pyrazine Content Analysis (1)>

Analysis of the pyrazine content of the manufactured pet foods by gas chromatograph-mass spectrometry using the solvent extraction described above yielded the results shown in Table 6. The units are ppm.

TABLE 6

|  | Beef tallow 1 | Hydrated glucose (%) | 2,5-dimethyl pyrazine (ppm) | 2,5-dimethyl pyrazine (ppm) | 2,3,5-trimethyl pyrazine (ppm) | Total pyrazines (ppm) | Palatability score |
|---|---|---|---|---|---|---|---|
| Comparative Example C | 1.5 | 0 | 0.4 | 0.2 | 0.2 | 0.8 | 50 |
| Example A-3 | 4.0 | 0 | 1.1 | 0.3 | 0.5 | 1.9 | 54 |
| Example A-4 | 5.0 | 0 | 2.0 | 0.6 | 0.9 | 3.5 | 63 |
| Example B-3 | 4.0 | 1.0 | 0.7 | 0.2 | 0.3 | 1.2 | 63 |

The total pyrazine content of each pet food prior to baking was less than the detection limit of 0.1 ppm.

From the results in Table 6, it is clear that the amounts of 2,5-dimethylpyrazine (2,5-DMP), 2,6-dimethylpyrazine (2,6-DMP) and 2,3,5-trimethylpyrazine (2,3,5-TMP) have increased as a result of the baking. Further, in the examples in which the first oil or fat was added, it is clear that the total pyrazine content has increased significantly.

Despite the fact that the total pyrazine content in Example B-4 was less than the total pyrazine content observed in Examples A-3 and A-4, the palatability score for Example B-3 was higher than that of Example A-3, and the same as that of Example A-4.

<Water Content and Fat Content Measurements (1)>

Using the normal pressure heated drying method described below, the water content of each of the food granules was determined. Further, using the acid decomposition diethyl ether extraction method described below, the total fat content of each of the food granules was also determined. These results are shown in Table 7. The reason that the fat content value for each example exceeds the combined weight of the first oil or fat and the second oil or fat is that the total fat content also includes fat components contained within the aforementioned mixture of ingredients.

TABLE 7

|  | Water content (wt %) | Fat content (wt %) |  | Water content (wt %) | Fat content (wt %) |
|---|---|---|---|---|---|
| Example A-1 | 5.8 | 17.51 | Example B-0 | 5.2 | 17.71 |
| Example A-2 | 5.3 | 17.76 | Example B-1 | 4.6 | 18.37 |
| Example A-3 | 5.6 | 16.34 | Example B-2 | 4.6 | 16.73 |
| Example A-4 | 5.7 | 16.19 | Example B-3 | 5.7 | 17.48 |
| Example A-5 | 5.7 | 16.58 | Example B-4 | 5.5 | 17.33 |
| Example A-6 | 5.6 | 15.79 | Example B-5 | 5.1 | 18.54 |
| Example A-7 | 5.3 | 17.7 | Example B-6 | 5.1 | 17.91 |
| Comparative Example C | 5.4 | 18.4 |  |  |  |

Pet Food Manufacture (2)

Reference Examples 1 to 4

Using the blend ratios shown in Table 8, grains, meat, fish, and vitamins and minerals were mixed and then crushed in a mixer to obtain ingredient mixtures.

The grains included corn, wheat flour, corn gluten meal, or soybeans or the like. The meat included chicken meal or pork meal or the like. The fish contained fish meal or the like.

TABLE 8

|  | Reference Example 1 Blend A (parts by weight) | Reference Example 2 Blend B (parts by weight) | Reference Example 3 Blend C (parts by weight) | Reference Example 4 Blend D (parts by weight) |
|---|---|---|---|---|
| Grains | 65 | 68 | 58 | 49 |
| Meat | 25 | 22 | 13 | 21 |
| Fish | 3 | 4 | 12 | 7 |
| Vitamins and minerals | 2 | 2 | 2 | 3 |
| Total | 95 | 96 | 85 | 80 |

Each of the obtained mixtures was granulated using an extruder to produce disc-shaped food granules having a diameter of 8 mm and a height (thickness) of 2 mm. At this time, a heat treatment was performed at 80 to 100° C. for 4 minutes to alphatize the starch component.

The thus obtained food granules were subjected to a drying treatment using a dryer at approximately 100° C. for approximately 20 minutes, thus yielding dry food granules.

The obtained dry food granules were subjected to a baking treatment at 300° C. for 30 seconds using ceramic heaters, which had been heated with a gas burner and emitted far infrared radiation, thus forming baked food granules.

The obtained baked food granules were coated using an animal-based oil or fat (beef tallow), a chicken extract and a fish extract, thus completing manufacture of a pet food. During the coating process, coating was performed so that, on a weight basis, the coating mixture contained 4 parts by weight of the animal-based oil or fat, and 2 parts by weight of the chicken extract and fish extract.

Reference Example 5

With the exception of changing the baking time to 60 seconds, a pet food was obtained in the same manner as Reference Example 4.

Reference Example 6

With the exception of changing the baking time to 90 seconds, a pet food was obtained in the same manner as Reference Example 4.

Comparative Examples 1 to 4

Following preparation of the aforementioned dry granules of the blends A to D, coating was performed without first performing a baking treatment, thus completing manufacture of pet foods of Comparative Examples 1 to 4.

<Pyrazine Content Analysis>

Analysis of the pyrazine content of the manufactured pet foods by gas chromatograph-mass spectrometry using the solvent extraction described above yielded the results shown in Table 9. The units are ppm. In Table 9, a value of "0" indicates a result less than the detection limit of 0.10 ppm.

TABLE 9

|  | Comparative Example 1 Blend A | Reference Example 1 Blend A | Comparative Example 2 Blend B | Reference Example 2 Blend B | Comparative Example 3 Blend C | Reference Example 3 Blend C | Comparative Example 4 Blend D | Reference Example 4 Blend D | Reference Example 5 Blend D | Reference Example 6 Blend D |
|---|---|---|---|---|---|---|---|---|---|---|
| 2,5-DMP | 0 | 0.3 | 0.1 | 1.7 | 0.1 | 3.9 | 0.3 | 1.6 | 15.0 | 7.0 |
| 2,6-DMP | 0 | 0 | 0 | 0.6 | 0 | 1.2 | 0.1 | 0.5 | 7.4 | 6.9 |
| 2,3,5-TMP | 0 | 0.1 | 0 | 0.7 | 0.1 | 1.9 | 0.2 | 1.2 | 26.0 | 26.0 |

Based on the above results, it is clear that the baking treatment results in an increase in the amount of at least one of 2,5-dimethylpyrazine (2,5-DMP), 2,6-dimethylpyrazine (2,6-DMP) and 2,3,5-trimethylpyrazine (2,3,5-TMP).

<Water Content Measurement>

The water content of each of the pet foods of Reference Examples 1 to 4 and Comparative Examples 1 to 4 was measured using the normal pressure heated drying method described below. The results are shown in Table 10. The units are % by weight.

(Normal Pressure Heated Drying Method)

The weight (W1 grams) of an aluminum weighing can was measured in advance as a constant weight. A sample was placed in the aluminum weighing can, and the weight (W2 grams) was measured. Subsequently, using a forced circulation hot air dryer, the sample was dried at 135° C. for 2 hours. Following cooling by standing in a dry atmosphere (inside a silica gel desiccator), the weight (W3 grams) was remeasured. The water content was determined from the measured weight values using the following formula.

Water content (%)=(W2−W3)÷(W2−W1)×100

Further, the fat content values for Reference Examples 1 to 4 were measured using the acid decomposition diethyl ether extraction method described below. The results are shown in Table 10. The units are % by weight.
(Acid Decomposition Diethyl Ether Extraction Method)

A 2 g analysis sample was weighed accurately and placed in a 100 ml beaker, 2 ml of ethanol was added, and following stirring of the mixture with a glass rod to swell the sample, 20 ml of 28% hydrochloric acid was added, the beaker was covered with a watch glass, and the beaker was then placed in a hot water bath at 70 to 80° C. and heated for one hour with occasional stirring of the contents, before being left to stand to cool.

The contents of the beaker were placed in a 200 mL separating funnel A, the beaker was washed sequentially with 10 ml of ethanol and then 25 ml of diethyl ether, and the wash liquids were both added to the separating funnel A.

A further 75 ml of diethyl ether was added to the separating funnel A, and the separating funnel was then shaken and left to stand. The diethyl ether layer (upper layer) was extracted using a pipette or the like, and placed in a 300 ml separating funnel B which already contained 20 ml of water.

Next, 50 ml of diethyl ether was added to the separating funnel A, the funnel was shaken and left to stand, and the diethyl ether layer was then extracted using a pipette or the like and added to the separating funnel B. This operation was performed twice.

The separating funnel B was shaken and left to stand, and the water layer (lower layer) was then discarded. Two additional 20 ml samples of water were then added separately to the separating funnel B, and shaken and discarded in the same manner. The diethyl ether layer was then filtered through a funnel fitted with an absorbent cotton and containing a suitable amount of at least 10 g of anhydrous sodium sulfate, and the filtrate was collected in a fat weighing bottle or a 300 ml round bottom flask. This fat weighing bottle or round bottom flask had been dried in advance at 95 to 100° C., cooled by standing in a desiccator, and then weighed accurately.

Next, the filtered diethyl ether was recovered, using a Soxhlet extractor in the case where a fat weighing bottle was used, or using a rotary evaporator in the case where a round bottom flask was used. The recovered diethyl ether was volatilized, the residue was dried at 95 to 100° C. for 3 hours, and following standing to cool inside a desiccator, the weight was measured accurately and the crude fat content within the sample was calculated.

Based on the above results, it is clear that the baking treatment reduces the water content by approximately 3.0 to 4.0% by weight. Further, the fat content values for the pet foods of Reference Examples 1 to 4 were all 22.0% by weight or less.
<Measurement of Rate of Reduction in Free Amino Acids>

Free amino acid analyses were performed for the pet foods of Reference Examples 2 and 4 and Comparative Examples 2 and 4, and for Reference Examples 2 and 4, the rates of reduction in lysine, histidine and methionine as a result of the baking treatment were determined using the following formula.

Rate of reduction (%)=((amino acid content of reference example)−(amino acid content of comparative example))÷(amino acid content of comparative example)×100

The results are shown in Table 11.

TABLE 11

|  | Reference Example 2 Blend B | Reference Example 4 Blend D |
|---|---|---|
| Lysine | 10.85 | 8.95 |
| Histidine | 10.58 | 10.36 |
| Methionine | 7.15 | 5.60 |

Based on the above results, it is clear that the amounts of lysine, histidine and methionine all decreased by at least 5.0% as a result of the baking treatment.

The results of performing free amino acid analyses of the dry food granules in the manufacturing process described above using a conventional amino acid analysis method described below are shown in Table 12. The units are %.
(Free Amino Acid Analysis)

To a sample of 1.5 g was added and mixed 25 ml of a 10% w/v sulfosalicylic acid solution, and an extraction was performed by shaking for 20 minutes. A sodium hydroxide solution of 3 mol/L was added to neutralize the obtained extract, a sodium citrate buffer solution of pH 2.2 was then added to adjust the pH of the extract to 2.2 and make the total volume up to 50 ml, and the extract was then filtered.

Using a portion of the thus obtained filtrate as a sample solution, an amino acid automatic analysis method was used to quantify the amounts of 17 free amino acids, namely arginine, lysine, histidine, phenylalanine, tyrosine, leucine, isoleucine, methionine, valine, alanine, glycine, proline, glutamic acid, serine, threonine, aspartic acid and cystine. The conditions are described below.
(Operating Conditions for Amino Acid Automatic Analyzer)

Apparatus: L-8800 high-speed amino acid analyzer [Hitachi High-Technologies Corporation], column: Hitachi custom ion exchange resin Ø4.6 mm×60 mm [Hitachi High-Technologies Corporation], mobile phase: MCI L-8500-PF (PF-1 to PF-4) [Mitsubishi Chemical Corporation], reaction reagent: ninhydrin coloring solution kit for Hitachi [manufactured by Wako Pure Chemical Industries, Ltd.], flow rate:

TABLE 10

|  | Comparative Example 1 Blend A | Reference Example 1 Blend A | Comparative Example 2 Blend B | Reference Example 2 Blend B | Comparative Example 3 Blend C | Reference Example 3 Blend C | Comparative Example 4 Blend D | Reference Example 4 Blend D |
|---|---|---|---|---|---|---|---|---|
| Water content (% by weight) | 9.0 | 6.0 | 9.0 | 5.0 | 7.0 | 4.0 | 8.0 | 5.0 |
| Fat content (% by weight) | — | 11.0 | — | 10.0 | — | 20.0 | — | 22.0 | mobile phase 0.35 ml/minute, reaction reagent 0.30 ml/minute, measurement wavelength: 570 nm (for measurement of the 16 amino acids excluding proline) and 440 nm (for measuring proline).

Further, measurement of the amount of tryptophan, which is not included within the 17 amino acids mentioned above, was performed in the following manner. A 2.5 ml sample of the above filtrate was extracted, the sample was made slightly alkaline by adding a 3 mol/L sodium hydroxide solution, thus preparing a 10 ml sample solution, and this sample solution was analyzed by high-performance liquid chromatography.

The conditions are described below.
(Operating Conditions for High-Performance Liquid Chromatograph)

Apparatus: LC-20AD [Shimadzu Corporation], detector: fluorescence spectrophotometer RF-20A$_{XS}$ [Shimadzu Corporation], column: Capcell Pak C18 AQ Ø4.6 mm×250 mm [Shiseido Co., Ltd.], mobile phase: mixed solution of 20 mmol/L perchloric acid and methanol (mixing ratio 80:20), flow rate: 0.7 mm/minute, fluorescence excitation wavelength: 285 nm, fluorescence measurement wavelength: 348 nm, column temperature: 40° C.

TABLE 12

| | Blend A (%) | Blend B (%) | Blend C (%) | Blend D (%) |
|---|---|---|---|---|
| Arginine | 0.051 | 0.0231 | 0.0182 | 0.0392 |
| Lysine | 0.035 | 0.0198 | 0.0343 | 0.0958 |
| Histidine | 0.010 | 0.0209 | 0.0129 | 0.0152 |
| Phenylalanine | 0.018 | 0.0143 | 0.0332 | 0.0370 |
| Tyrosine | 0.020 | 0.0143 | 0.0204 | 0.0239 |
| Leucine | 0.030 | 0.0242 | 0.0600 | 0.0631 |
| Isoleucine | 0.016 | 0.0099 | 0.0279 | 0.0305 |
| Methionine | 0.018 | 0.0671 | 0.2894 | 0.3939 |
| Valine | 0.024 | 0.0176 | 0.0418 | 0.0522 |
| Alanine | 0.058 | 0.0506 | 0.0954 | 0.1055 |
| Glycine | 0.030 | 0.0209 | 0.0322 | 0.2078 |
| Proline | 0.054 | 0.0506 | 0.0536 | 0.0696 |
| Glutamic acid | 0.079 | 0.0385 | 0.0632 | 0.0740 |
| Serine | 0.027 | 0.0143 | 0.0268 | 0.0501 |
| Threonine | 0.021 | 0.0121 | 0.0236 | 0.0326 |
| Aspartic acid | 0.063 | 0.0286 | 0.0375 | 0.0588 |
| Tryptophan | 0.009 | 0.0055 | 0.0064 | 0.0065 | composed of Reference Example 2 and Comparative Example 2, a pair composed of Reference Example 3 and Comparative Example 3, and a pair composed of Reference Example 4 and Comparative Example 4. Each pair was tested over two days using 20 cats as monitors.

On the first day, each cat was provided with 70 g of each of the pet foods of the first pair, with the first pet food supplied from the left and the second pet food supplied from the right, and the amount of each pet food eaten by the cat was measured after one hour.

Based on the total weight of pet food consumed by the cat on the first day, the amount consumed of the pet food of the reference example and the amount consumed of the pet food of the comparative example were determined as percentages. The percentages obtained for the 20 cats being monitored were averaged to obtain the first day results.

On the second day, each cat was provided with 70 g of each of the pet foods of the first pair, with the first pet food supplied from the right and the second pet food supplied from the left, and the amount of each pet food eaten by the cat was measured after one hour.

Based on the total weight of pet food consumed by the cat on the second day, the amount consumed of the pet food of the reference example and the amount consumed of the pet food of the comparative example were determined as percentages. The percentages obtained for the 20 cats being monitored were averaged to obtain the second day results.

Finally, the results for the first day and the second day were averaged, and the consumption ratio that represents the final result (palatability) was determined. A higher numerical value for this palatability indicates greater consumption by choice by the monitored cats.

The pet foods of the second pair through to the fourth pair were evaluated in the same manner as the pet foods of the first pair.

TABLE 13

| | Comparative Example 1 Blend A | Reference Example 1 Blend A | Comparative Example 2 Blend B | Reference Example 2 Blend B | Comparative Example 3 Blend C | Reference Example 3 Blend C | Comparative Example 4 Blend D | Reference Example 4 Blend D |
|---|---|---|---|---|---|---|---|---|
| Palatability | 36 | 64 | 34 | 66 | 44 | 56 | 41 | 59 |

Based on the above results, it is clear that by using dry food granules containing a large amount of free methionine, the pyrazine content of the aforementioned baked food granules is increased. Further, it is also clear that the pyrazine content of the baked food granules is increased by using dry food granules having a large free amino acid content.

<Palatability Evaluation (2)>

The palatability (desirability) of Reference Examples 1 to 4 and Comparative Examples 1 to 4 were evaluated using the method described below. The results are shown in Table 13.

The evaluation method was as follows.

First, a first pair of pet foods through to a fourth pair of pet foods were prepared, namely a pair composed of Reference Example 1 and Comparative Example 1, a pair Based on the above results, it is clear that Reference Examples 1 to 4 exhibited superior palatability to Comparative Examples 1 to 4.

<Palatability Evaluation (3)>

The palatability (desirability) of Reference Example 4 and Comparative Example 4 were evaluated using the two bowl test and the single use test described below. The results are shown in Tables 14 and 15.

The two bowl test was performed over a continuous 6-day period, by simultaneously providing the pet foods of Reference Example 4 and Comparative Example 4, and recording the eating habits of the cat. In this test, the amounts consumed were not measured, but rather the owner of the cat judged which of the test items exhibited better palatability for the cat. A pair of one owner and one cat was regarded as one monitor, and evaluations were performed by 50 monitors. The two bowl test was performed using the sequence (a1) to (e1) described below.

(a1) On the first day, the two types of pet foods, namely Reference Example 4 and Comparative Example 4, were provided simultaneously on the left and right in an amount of 70 g per day, and the eating habits of the cat were checked. At this time, the amounts consumed were not measured. Twenty five of the monitors provided Reference Example 4 from the left side, and the remaining 25 monitors provided Comparative Example 4 from the left side, and the eating habits of the cats were checked.

(b1) On the second day through fifth day, the same pet food as in the first day was provided, and the eating habits of the cats were checked.

(c1) On the third day through to the sixth day, the left and right arrangement of the two pet foods was switched each day, and the eating habits of the cat were checked.

(d1) Following completion of the sixth day, the owner made a judgment as to which of Reference Example 4 and Comparative Example 4 the cat preferred. In terms of evaluation criteria, the 50 monitors were asked to respond with an evaluation of "Reference Example 4 was extremely favorable" (hereafter referred to as "A"), "Reference Example 4 was slightly favorable" (hereafter referred to as "13"), "the two were approximately the same with no discernible difference" (hereafter referred to as "C"), "Comparative Example 4 was slightly favorable" (hereafter referred to as "D"), or "Comparative Example 4 was extremely favorable" (hereafter referred to as "E"), and the number of each response was calculated as a percentage.

(e1) Based on the above evaluation criteria, a numerical score was calculated for each of Reference Example 4 and Comparative Example 4 using the following formulas.

Reference Example 4 score=(percentage of $A$ responses)+(percentage of $B$ responses)+(percentage of $C$ responses)+2.

Comparative Example 4 score=(percentage of $E$ responses)+(percentage of $D$ responses)+(percentage of $C$ responses)+2.

In the single use test, one pet food of either Reference Example 4 or Comparative Example 4 was provided continuously for 5 days, and the other pet food was then provided for the subsequent 5 days, and the eating habits of the cat were checked. At this time, the amounts consumed were not measured, and the owner made a judgment as to which of the test items exhibited better palatability for the cat. A pair of one owner and one cat was regarded as one monitor, and evaluations were performed by 50 monitors. The single use test was performed using the sequence (a2) to (e2) described below.

(a2) On the first day, the pet food of Reference Example 4 was provided to 25 monitors in an amount of 70 g per day, and the pet food of Comparative Example 4 was provided to the remaining 25 monitors in an amount of 70 g per day, and the eating habits of the cats were checked. At this time, the amounts consumed were not measured.

(b2) On the second day through to the fifth day, the pet foods were supplied in the same manner as the first day, and the eating habits of the cats were checked.

(c2) On the sixth day through to the tenth day, the other pet food, different from that provided on the first to fifth days, was provided to each monitor in an amount of 70 g per day, and the eating habits of the cats were checked.

(d2) Following completion of the tenth day, the owner made a judgment as to which of Reference Example 4 and Comparative Example 4 the cat preferred. In terms of evaluation criteria, the 50 monitors were asked to respond with an evaluation of "Reference Example 4 was extremely favorable (A)", "Reference Example 4 was slightly favorable (B)", "the two were approximately the same with no discernible difference (C)", "Comparative Example 4 was slightly favorable (D)", or "Comparative Example 4 was extremely favorable (E)", and the number of each response was calculated as a percentage.

(e2) Based on the above evaluation criteria, a numerical score was calculated for each of Reference Example 4 and Comparative Example 4 using the following formulas.

Reference Example 4 score=(percentage of $A$ responses)+(percentage of $B$ responses)+(percentage of $C$ responses)+2.

Comparative Example 4 score=(percentage of $E$ responses)+(percentage of $D$ responses)+(percentage of $C$ responses)+2.

TABLE 14

| | (Two Bowl Test) | | | | |
|---|---|---|---|---|---|
| | Comparative Example 4 was extremely favorable (E) | Comparative Example 4 was slightly favorable (D) | No discernible difference (C) | Reference Example 4 was slightly favorable (B) | Reference Example 4 was extremely favorable (A) |
| Percentage of monitors | 2% | 29% | 10% | 40% | 19% |
| Scores | | Comparative Example 4:Reference Example 4 = 36:64 | | | |

TABLE 15

| | (Single Use Test) | | | | |
|---|---|---|---|---|---|
| | Comparative Example 4 was extremely favorable (E) | Comparative Example 4 was slightly favorable (D) | No discernible difference (C) | Reference Example 4 was slightly favorable (B) | Reference Example 4 was extremely favorable (A) |
| Percentage of monitors | 6% | 17% | 37% | 29% | 12% |
| Scores | | Comparative Example 4:Reference Example 4 = 41:59 | | | |

Based on the above results, it is clear that in both the two bowl test and the single use test, Reference Example 4 exhibited superior palatability to Comparative Example 4.

<Palatability Evaluation (4)>

The palatability (desirability) of the pet foods of Reference Examples 4, 5 and 6 were evaluated. The results are shown in Table 16.

The evaluation method was as follows.

Using 3 cats as monitors, testing was performed in one day. Fifty grams of each of the pet foods of Reference Examples 4, 5 and 6 were provided simultaneously to each cat, and the amounts consumed were measured after 6 hours. The amounts eaten were averaged across the 3 cats, and the resulting average weights were recorded as final results.

TABLE 16

|  | Reference Example 4 | Reference Example 5 | Reference Example 6 |
|---|---|---|---|
| Amount consumed (g) | 40 g | 14 g | 5 g |
| Evaluation | extremely well eaten | well eaten | eaten |

Comparative Example 5

With the exception of performing a frying treatment in oil at 180° C. for 30 seconds instead of the aforementioned baking treatment, a pet food was manufactured using the same method as that described for Reference Example 4.

Measurement results revealed that the obtained pet food had a fat (oil) content of approximately 27% by weight, exceeding 22.0% by weight.

The pyrazine content of the obtained pet food is also shown in Table 17.

Reference Example 11

With the exception of performing a roasting treatment in a frying pan at 180° C. for 3 minutes, a pet food was manufactured using the same method as that described for Reference Example 4. In this case, because the roasting treatment was performed by pouring a little oil into the frying pan, the oil content of the obtained pet food was approximately 13.5% by weight.

The pyrazine content of the obtained pet food is also shown in Table 17. The units are ppm.

TABLE 17

|  | Reference Example 4 Blend D | Comparative Example 4 Blend D | Comparative Example 5 Blend D | Reference Example 11 Blend D |
|---|---|---|---|---|
| 2,5-DMP | 1.6 | 0.3 | 16.0 | 1.1 |
| 2,6-DMP | 0.5 | 0.1 | 3.6 | 0.4 |
| 2,3,5-TMP | 1.2 | 0.2 | 16.0 | 1.0 |

Pet Food Manufacture (3)

Reference Examples 7 to 10

Using the blend ratios shown in Table 18, grains, meat, fish, and vitamins and minerals were mixed and then crushed in a mixer to obtain ingredient mixtures.

The grains included corn, wheat flour, corn gluten meal, or soybeans or the like. The meat included chicken meal or pork meal or the like. The fish contained fish meal or the like.

TABLE 18

|  | Reference Example 7 Blend A (parts by weight) | Reference Example 8 Blend B (parts by weight) | Reference Example 9 Blend C (parts by weight) | Reference Example 10 Blend D (parts by weight) |
|---|---|---|---|---|
| Grains | 65 | 68 | 58 | 49 |
| Meat | 25 | 22 | 13 | 21 |
| Fish | 3 | 4 | 12 | 7 |
| Vitamins and minerals | 2 | 2 | 2 | 3 |
| Total | 95 | 96 | 85 | 80 |

Each of the obtained mixtures was granulated using an extruder to produce disc-shaped food granules having a diameter and height (thickness) of 3 mm to 30 mm. At this time, a heat treatment was performed at 80 to 100° C. for 3 to 6 minutes, thereby alphatizing the starch component.

The thus obtained food granules were subjected to a drying treatment, using a dryer, under a hot air stream at 70 to 90° C. for 10 to 30 minutes, thus yielding dry food granules. Beef tallow was added to the granules in an amount of 1.5 wt % relative to the weight of the dry food granules, thus coating the surfaces of the dry food granules. This coating prevented the generation of fine powder (dust) from the dry food granules.

Next, as is illustrated schematically in FIG. 1, the dry food granules 4 that had been surface-coated with beef tallow were placed on a metal mesh and transported by a net conveyor 3, and inside an oven 2 fitted with ceramic heaters 1, far infrared radiation was irradiated from above and below the mesh to heat the food granules 4. Specifically, the temperature inside the oven 2 prior to introduction of the food granules 4 (the temperature of the empty oven) was set within a range from 240 to 260° C., the temperature inside the oven 2 during the continuous introduction of the food granules 4 (the temperature during granule transport) was within a range from 190 to 210° C., and the transport speed of the mesh by the net conveyor 3 was adjusted so that each single food granule was subjected to a baking time of 20 to 75 seconds. During baking, the separation distance between the ceramic heaters 1 and the food granules 4 was set to approximately 100 mm. The temperature inside the oven 2 (atmospheric temperature) was monitored using a thermometer installed in a position located 30 mm above the mesh, 350 mm from the edge of the mesh, and 95 mm from the central region of the ceramic heaters 1.

Following heating, the food granules 4 transported out of the oven 2 were cooled naturally in air while traveling along the net conveyor 3.

Subsequently, the food granules 4 were placed in a kettle and heated to at least 40° C., and with the granules undergoing constant mixing, an oil or fat was added in an amount of 3 to 15 wt % relative to the weight of the food granules 4, the pressure inside the kettle was reduced to 0.2 atmospheres, and the pressure was then returned to atmospheric pressure over a period of approximately 2 minutes, thus causing the oil or fat to penetrate into the interior of the food granules 4.

The food granules obtained in Reference Examples 7 to 10 each had the amount of oil or fat appropriately regulated. Specifically, the oil content was able to be regulated to approximately 13.5%. Further, because the palatability for pets was good, it is clear that the taste and texture of the pet foods obtained using the manufacturing method of Reference Examples 7 to 10 were attractive to pets.

Furthermore, the baking time (heating time) for the irradiation with far infrared radiation was 20 to 75 seconds, which is shorter than the heating time sufficient for grilling or roasting. For example, in the roasting treatment of Reference Example 11, 3 minutes were sufficient to complete the heating process. Using the pet foods of Reference Examples 7 to 10 which were manufactured using far infrared irradiation (baking time: 30 seconds), and the pet food of Reference Example 11 which was manufactured using a 3-minute roasting treatment, palatability evaluations were performed using the same method as that described for the aforementioned two bowl test. The evaluation results revealed that the pet foods of Reference Examples 7 to 10 exhibited similar or superior palatability to the pet food of Reference Example 11. Accordingly, the manufacturing method using irradiation with far infrared radiation enables the manufacture of a highly palatable pet food despite using a baking treatment that is shorter than a typical roasting treatment, and therefore it can be said that, in some embodiments, the method offers excellent manufacturing efficiency.

Each of the formulations and combinations described in the above embodiments are merely examples, and additions, omissions, substitutions and other modifications can be made without departing from the spirit or scope of the present invention. Accordingly, the present invention is not to be considered as being limited by the above embodiments, and is only limited by the scope of the claims.

INDUSTRIAL APPLICABILITY

The method of manufacturing a pet food according to the present invention enables the manufacture of a pet food having good nutritional balance and excellent palatability (desirability) for pets, and is therefore extremely useful industrially. Further, because the method of manufacturing a pet food according to the present description enables a favorable taste to be achieved without performing a frying treatment in oil, a low calorie pet food is manufactured, and therefore the method is very useful industrially. The pet food of the present description makes it possible to exhibit excellent palatability (desirability) for pets, and satisfy the desires of health-conscious owners, and is therefore extremely useful industrially.

The invention claimed is:

1. A method of manufacturing a pet food, the method consisting essentially of:
    granulating a mixture of ingredients by an extruder to obtain food granules,
    drying the food granules by hot air at 70° C. to 90° C., independently from granulating the mixture of ingredients, to obtain dried food granules having a water content of less than or equal to 12.0% by weight,
    adding a first oil or fat to the dried food granules,
    baking the dried food granules to which the first oil or fat have been added, wherein, during the baking, a ceramic heater is used as an irradiation source for far infrared radiation, and the baking is performed with a distance between the ceramic heater and the dried food granules to which the first oil or fat have been added is set within a range from 80 mm to 120 mm, and far infrared radiation is irradiated to generate an atmospheric temperature of 160° C. to 230° C. for 20 seconds to 55 seconds, to obtain baked food granules, and
    placing the baked food granules in a kettle, heating the baked food granules to at least 40° C. and reducing pressure to below atmospheric pressure in a state where a second oil or fat is in contact with a surface of the baked food granules, and returning the pressure to atmospheric pressure, wherein
    the mixture of ingredients consists essentially of 55% to 75% of at least one member selected from the group consisting of corn, wheat flour, corn gluten meal and soybeans, 10% to 25% of at least one member selected from the group consisting of chicken meal, pork meal and chicken extract, 5% to 15% of fish, and 2% to 5% of vitamins and minerals,
    the food granules contain a reducing sugar prior to baking,
    an amount added of the first oil or fat represents 0.5 to 8.0% by weight of a total weight of a combination of the mixture, the first oil or fat and the second oil or fat, and
    a combined amount added of the first oil or fat and the second oil or fat represents 5.0 to 13.0% by weight of the total weight of the pet food.

2. A method of manufacturing a pet food, the method consisting essentially of:
    granulating a mixture of ingredients by an extruder to obtain food granules,
    drying the food granules by hot air at 70° C. to 90° C., independently from granulating the mixture of ingredients, to obtain dried food granules having a water content less than or equal to 12.0% by weight,
    adding a first oil or fat to the dried food granules,
    baking the dried food granules to which the first oil or fat have been added, wherein, during the baking, a ceramic heater is used as an irradiation source for far infrared radiation, and the baking is performed with a distance between the ceramic heater and the dried food granules to which the first oil or fat have been added is set within a range from 80 mm to 120 mm, and far infrared radiation is irradiated to generate an atmospheric temperature of 160° C. to 230° C. for 20 seconds to 55 seconds, to obtained baked food granules, and
    placing the baked food granules in a kettle, heating the baked food granules to at least 40° C. and reducing pressure to below atmospheric pressure in a state where a second oil or fat is in contact with a surface of the baked food granules, and returning the pressure to atmospheric pressure, wherein
    the mixture of ingredients consists essentially of 55% to 75% of at least one member selected from the group consisting of corn, wheat flour, corn gluten meal and soybeans, 10% to 25% of at least one member selected from the group consisting of chicken meal, pork meal and chicken extract, 5% to 15% of fish, and 2% to 5% of vitamins and minerals,
    an amount added of the first oil or fat represents 2.0 to 10.0% by weight of a total weight of a combination of the mixture, the first oil or fat and the second oil or fat,
    a combined amount added of the first oil or fat and the second oil or fat represents 5.0 to 13.0% by weight of the total weight of the pet food.

3. The method of manufacturing a pet food according to claim 1, wherein a temperature during the baking is a temperature that generates pyrazines in the food granules.

4. The method of manufacturing a pet food according to claim 3, wherein the baking is performed so that a pyrazine content within the food granules following baking is at least 0.10 ppm higher than a pyrazine content within the food granules prior to the baking.

5. The method of manufacturing a pet food according to claim 3, wherein the pyrazines comprises one or more compounds among 2,5-dimethylpyrazine, 2,6-dimethylpyrazine and 2,3,5-trimethylpyrazine.

6. The method of manufacturing a pet food according to claim 1, wherein during the granulating, the food granules are obtained for which a shortest diameter and a longest diameter are both within a range from 3 mm to 30 mm.

7. The method of manufacturing a pet food according to claim 1, wherein during the baking, the dried food granules to which the first oil or fat have been added are transported on a mesh while the far infrared radiation is irradiated from at least one of above and below the mesh.

8. The method of manufacturing a pet food according to claim 1, wherein during the granulating, the mixture is heated at a temperature of not more than 150° C.

9. A method of manufacturing a pet food, the method consisting essentially of:
   granulating a mixture of ingredients by an extruder to obtain food granules,
   drying the food granules by hot air at 70° C. to 90° C., independently from granulating the mixture of ingredients, to obtain dried food granules having a water content less than or equal to 12.0% by weight,
   adding a first oil or fat to the dried food granules,
   baking the dried food granules to which the first oil or fat have been added, wherein, during the baking, a ceramic heater is used as an irradiation source for far infrared radiation, and the baking is performed with a distance between the ceramic heater and the dried food granules to which the first oil or fat have been added is set within a range from 80 mm to 120 mm, and far infrared radiation is irradiated to generate an atmospheric temperature of 160° C. to 230° C. for 20 seconds to 55 seconds, to obtain baked food granules, and
   placing the baked food granules in a kettle, heating the baked food granules to at least 40° C. and reducing pressure to below atmospheric pressure in a state where a second oil or fat is in contact with a surface of the baked food granules, and returning the pressure to atmospheric pressure, wherein
   the mixture of ingredients consists essentially of 65% to 85% of at least one member selected from the group consisting of corn, wheat flour, corn gluten meal and soybeans, 7% to 20% of at least one member selected from the group consisting of chicken meal, pork meal and chicken extract, 5% to 15% of fish, and 2% to 5% of vitamins and minerals,
   the food granules contain a reducing sugar prior to baking,
   an amount added of the first oil or fat represents 0.5% to 8.0% by weight of a total weight of a combination of the mixture, the first oil or fat and the second oil or fat, and
   a combined amount added of the first oil or fat and the second oil or fat represents 5.0% to 13.0% by weight of the total weight of the pet food.

10. A method of manufacturing a pet food, the method consisting essentially of:
   granulating a mixture of ingredients by an extruder to obtain food granules,
   drying the food granules by hot air at 70° C. to 90° C., independently from granulating the mixture of ingredients, to obtain dried good granules having a water content of less than or equal to 12.0% by weight,
   ladding a first oil or fat to the dried food granules,
   baking the dried food granules to which the first oil or fat have been added, wherein, during the baking, a ceramic heater is used as an irradiation source for far infrared radiation, and the baking is performed with a distance between the ceramic heater and the dried food granules to which the first oil or fat have been added is set within a range from 80 mm to 120 mm, and far infrared radiation is irradiated to generate an atmospheric temperature 160° C. to 230° C. for 20 seconds to 55 seconds, to obtain bake food granules, and
   placing the baked food granules in a kettle, heating the baked food granules to at least 40° C. and reducing pressure to below atmospheric pressure in a state where a second oil or fat is in contact with a surface of the baked food granules, and returning the pressure to atmospheric pressure, wherein
   the mixture of ingredients consists essentially of 65% to 85% of at least one member selected from the group consisting of corn, wheat flour, corn gluten meal and soybeans, 7% to 20% of at least one member selected from the group consisting of chicken meal, pork meal and chicken extract, 5% to 15% of fish, and 2% to 5% of vitamins and minerals,
   an amount added of the first oil or fat represents 2.0% to 10.0% by weight of a total weight of a combination of the mixture, the first oil or fat and the second oil or fat,
   a combined amount added of the first oil or fat and the second oil or fat represents 5.0% to 13.0% by weight of the total weight of the pet food.

11. The method of manufacturing a pet food according to claim 9, wherein a temperature during the baking is a temperature that generates pyrazines in the food granules.

12. The method of manufacturing a pet food according to claim 11, wherein the baking is performed so that a pyrazine content within the food granules following baking is at least 0.10 ppm higher than a pyrazine content within the food granules prior to the baking.

13. The method of manufacturing a pet food according to claim 11, wherein the pyrazines comprises one or more compounds among 2,5-dimethylpyrazine, 2,6-dimethylpyrazine and 2,3,5-trimethylpyrazine.

14. The method of manufacturing a pet food according to claim 9, wherein during the granulating, the food granules are obtained for which a shortest diameter and a longest diameter are both within a range from 3 mm to 30 mm.

15. The method of manufacturing a pet food according to claim 9, wherein during the baking, the dried food granules to which the first oil or fat have been added are transported on a mesh while the far infrared radiation is irradiated from at least one of above and below the mesh.

16. The method of manufacturing a pet food according to claim 9, wherein during the granulating, the mixture is heated at a temperature of not more than 150° C.

* * * * *